(12) United States Patent
Li et al.

(10) Patent No.: US 12,267,273 B2
(45) Date of Patent: Apr. 1, 2025

(54) METHOD AND APPARATUS FOR SENDING MULTICAST CONTROL CHANNEL

(71) Applicant: HUAWEI TECHNOLOGIES CO., LTD., Guangdong (CN)

(72) Inventors: Bingzhao Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 17/671,220

(22) Filed: Feb. 14, 2022

(65) Prior Publication Data

US 2022/0166590 A1 May 26, 2022

Related U.S. Application Data

(63) Continuation of application No. PCT/CN2020/108742, filed on Aug. 12, 2020.

(30) Foreign Application Priority Data

Aug. 14, 2019 (CN) .......................... 201910749271.X

(51) Int. Cl.
*H04L 5/00* (2006.01)
*H04W 4/06* (2009.01)

(52) U.S. Cl.
CPC .............. *H04L 5/0053* (2013.01); *H04W 4/06* (2013.01)

(58) Field of Classification Search
CPC ............................... H04L 5/0053; H04W 4/06
See application file for complete search history.

(56) References Cited

U.S. PATENT DOCUMENTS

2015/0223028 A1* 8/2015 Wang ..................... H04W 4/06
370/312
2016/0050077 A1 2/2016 Raj et al.
(Continued)

FOREIGN PATENT DOCUMENTS

CN 101925000 A 12/2010
CN 102056081 A 5/2011
(Continued)

OTHER PUBLICATIONS

PCT International Search Report and Written Opinion issued in International Application No. PCT/CN2020/108742 on Nov. 17, 2020, 17 pages (with English translation).
(Continued)

*Primary Examiner* — Ricky Q Ngo
*Assistant Examiner* — Stephen N Steiner
(74) *Attorney, Agent, or Firm* — Fish & Richardson P.C.

(57) ABSTRACT

Methods and apparatuses for sending a multicast control channel are provided. One example method includes a terminal device receiving first configuration information, where the first configuration information indicates N modification periods, and N is an integer greater than 1. The terminal device determines, based on the first configuration information, a modification period corresponding to a first service, and monitors a modification notification of an MCCH based on the modification period corresponding to the first service. Therefore, in some instances, services with different latency sensitivities can correspond to different modification periods to meet latency requirements of different services and ensure an electricity saving effect of the terminal device.

19 Claims, 8 Drawing Sheets

(56) References Cited

U.S. PATENT DOCUMENTS

| | | | |
|---|---|---|---|
| 2018/0049006 A1 | 2/2018 | Hong et al. | |
| 2018/0176744 A1* | 6/2018 | Li | H04W 4/06 |
| 2019/0174529 A1 | 6/2019 | Tie et al. | |
| 2019/0223156 A1 | 7/2019 | Fujishiro et al. | |
| 2019/0261140 A1* | 8/2019 | Fujishiro | H04W 4/80 |
| 2021/0084677 A1* | 3/2021 | Wänstedt | H04W 4/06 |

FOREIGN PATENT DOCUMENTS

| | | |
|---|---|---|
| CN | 107333246 A | 11/2017 |
| CN | 107734646 A | 2/2018 |

OTHER PUBLICATIONS

Samsung, "On Supporting Multiple Modification Periods in NR," 3GPP TSG-RAN WG2 Meeting #102, R2-1808215, Busan, Korea, May 21-25, 2018, 2 pages.

Office Action in Chinese Appln. No. 201910749271.X, dated Apr. 25, 2023, 7 pages.

3GPP TR 36.890 V13.0.0 (Jun. 2015), "3rd Generation Partnership Project; Technical Specification Group Radio Access Network; Evolved Universal Terrestrial Radio Access (E-UTRA); Study on Single-Cell Point-to-Multipoint Transmission for E-UTRA (Release 13)," Jun. 2015, 32 pages.

Extended European Search Report issued in European Application No. 20853392.7 on Aug. 26, 2022, 11 pages.

Kyocera, "Details of Multicast Configuration for FeMTC and eNB-IoT," 3GPP TSG-RAN WG2 #96, R2-168029, Reno, USA, Nov. 14-18, 2016, 8 pages.

Kyocera, "RRC Configuration of Multicast Enhancements for FeMTC and eNB-IoT," 3GPP TSG-RAN WG2 #95bis, R2-166851, Kaohsiung, Taiwan, Oct. 10-14, 2016, 10 pages.

* cited by examiner

METHOD AND APPARATUS FOR SENDING MULTICAST CONTROL CHANNEL

CROSS-REFERENCE TO RELATED APPLICATIONS

This application is a continuation of International Application No. PCT/CN2020/108742, filed on Aug. 12, 2020, which claims priority to Chinese Patent Application No. 201910749271.X, filed on Aug. 14, 2019. The disclosures of the aforementioned applications are hereby incorporated by reference in their entireties.

TECHNICAL FIELD

This application relates to the field of communications technologies, and in particular, to a method and an apparatus for sending a multicast control channel.

BACKGROUND

Single cell point to multipoint (SC-PTM) is a multicast transmission technology. Compared with that in an evolved multimedia broadcast multicast service (eMBMS), all cells in a region need to simultaneously send same data, in the SC-PTM, only a cell that includes a user in a region needs to send data, and a cell that does not include a user does not need to send data, so that air interface resources can be saved. FIG. 1 is a schematic diagram of a scenario of a multicast service.

Two logical channels are introduced into the SC-PTM and include a single cell multicast control channel (SC-MCCH) and a single cell multicast transport channel (SC-MTCH). There is only one SC-MCCH, used to transmit control information that includes configuration information of the SC-MTCH, for example, a group-radio network temporary identity (G-RNTI) and a discontinuous reception (DRX) parameter that correspond to the SC-MTCH. The SC-MTCH is used to transmit multicast service data, and each multicast service corresponds to one SC-MTCH, as shown in FIG. 2.

The SC-MCCH is sent periodically. Specifically, an access network device broadcasts configuration information of the SC-MCCH by using a system information block (SIB) 20, and the configuration information includes a modification period of the SC-MCCH, a repetition period of the SC-MCCH, and the like, as shown in FIG. 2. The access network device periodically sends the SC-MCCH based on the repetition period that is configured by the SIB 20 and that is of the SC-MCCH. The SC-MCCH uses a modification period mechanism. To be specific, content carried in an SC-MCCH that is sent by the access network device within a repetition period within one modification period is the same. If the content carried in the SC-MCCH needs to be modified, the access network device can only start to send an SC-MCCH carrying the modified content, namely, an updated SC-MCCH, from a boundary of the modification period. The access network device sends a modification notification of the SC-MCCH at the boundary of the modification period. The modification notification is carried by using a physical downlink control channel (PDCCH) scrambled based on a single cell-notification radio network temporary identity (single cell-notification RNTI, SC-N-RNTI). After user equipment (UE) receives the modification notification of the SC-MCCH, the UE receives the SC-MCCH carrying the modified content in a same subframe. That is, the modification notification of the SC-MCCH and the SC-MCCH carrying the modified content are sent within a same modification period, as shown in FIG. 3.

In the conventional technology, an SC-MCCH has a unique modification period and a unique repetition period. Usually, a long modification period and a long repetition period enable the UE to save electricity but prolong a reading latency of control information. A short modification period and a short repetition period cause the UE to consume more electricity but reduce the reading latency of control information. Further, it can be learned that because different multicast services have different latency requirements, if a short modification period and a short repetition period are configured based on a latency requirement of a latency-sensitive multicast service, UE that does not need a latency-sensitive multicast service consumes more electricity; if a long modification period and a long repetition period are configured based on a latency requirement of a latency-insensitive multicast service, a latency requirement of a latency-sensitive multicast service cannot be met. Therefore, because the SC-MCCH has a unique modification period and a unique repetition period, configurations of the modification period and the repetition period cannot take into account both latency requirements of different multicast services and an electricity saving effect of UE.

SUMMARY

Embodiments of this application provide a method and an apparatus for sending a multicast control channel, to resolve a problem that because an SC-MCCH has a unique modification period and a unique repetition period, configurations of the modification period and the repetition period cannot take into account both latency requirements of different multicast services and an electricity saving effect of UE.

According to a first aspect, an embodiment of this application provides a method for sending a multicast control channel. The method includes:

A terminal device receives first configuration information, where the first configuration information indicates N modification periods, and N is an integer greater than 1; and the terminal device determines, based on the first configuration information, a modification period corresponding to a first service, and monitors a modification notification of an MCCH based on the modification period corresponding to the first service.

Therefore, compared with that in the conventional technology, an SC-MCCH has a unique modification period and a unique repetition period, in the method provided in this embodiment of this application, services having different latency requirements (or latency sensitivities) can correspond to different modification periods, to meet latency requirements of different services and achieve an electricity saving effect of the terminal device.

In a possible design, that the terminal device determines, based on the first configuration information, a modification period corresponding to a first service may mean that the terminal device determines, based on a latency requirement of the first service and the first configuration information, the modification period corresponding to the first service.

According to the design, the terminal device can directly select, based on the latency requirement of the first service and the first configuration information, a modification period that meets the latency requirement of the first service as the modification period of the first service. The solution is simple and convenient.

In a possible design, the first configuration information further includes a classification identifier corresponding to each modification period. That the terminal device determines, based on the first configuration information, a modification period corresponding to a first service may mean that the terminal device determines, based on a classification identifier corresponding to the first service and the first configuration information, the modification period corresponding to the first service.

According to the design, the terminal device can first determine the classification identifier corresponding to the first service, and then determine, based on the classification identifier corresponding to the first service and the first configuration information, a modification period corresponding to the classification identifier as the modification period of the first service.

In a possible design, the first configuration information includes N pieces of MCCH configuration information, the N pieces of MCCH configuration information and N MCCHs are in a one-to-one correspondence, and each piece of MCCH configuration information includes a modification period of a corresponding MCCH and a classification identifier of the corresponding MCCH; or the first configuration information includes the N modification periods of one MCCH and the classification identifier corresponding to each modification period.

According to the design, the first configuration information can indicate the N modification periods in a plurality of possible forms.

In a possible design, the first configuration information includes N pieces of MCCH configuration information and a first modification period, the N pieces of MCCH configuration information and N MCCHs are in a one-to-one correspondence, each piece of MCCH configuration information includes a first coefficient of a corresponding MCCH and a classification identifier of the corresponding MCCH, and a modification period of each MCCH is determined based on the first modification period and the first coefficient that is included in the MCCH configuration information and that is of the corresponding MCCH; or the first configuration information includes a first modification period, N first coefficients, and a classification identifier corresponding to each first coefficient, and the N modification periods are determined based on the first modification period and the N first coefficients.

It should be understood that the first modification period may be configured by an access network device through higher layer signaling or may be predefined in a protocol, that is, does not need to be configured or notified or indicated by the access network device.

According to the design, the first configuration information can indicate the N modification periods in a plurality of possible forms.

In a possible design, the first configuration information further indicates N repetition periods, and the N repetition periods and the N modification periods are in a one-to-one correspondence; and the first configuration information further includes bias information, and the bias information is used to determine a location of each repetition period.

It should be understood that for a form in which the first configuration information indicates the N repetition periods, refer to a form in which the first configuration information indicates the N modification periods.

In a possible design, the method further includes: The terminal device receives third configuration information, where the third configuration information is used to notify version information of an MCCH transmitted in each repetition period; and the terminal device determines, based on the third configuration information, a repetition period used to perform combined reception on an MCCH.

According to the design, the terminal device can perform combined reception only on an MCCH having a same version number within one modification period.

In a possible design, the method further includes: The terminal device receives second configuration information, where the second configuration information indicates the classification identifier corresponding to the first service. In addition, the second configuration information further indicates a correspondence between the M services and the N classification identifiers. The correspondence between the M services and the N classification identifiers or the classification identifier corresponding to the first service may be included in the first configuration information or may be a single piece of configuration information (for example, the second configuration information) and is sent separately with the first configuration information.

In a possible design, the second configuration information is received by the terminal device from an access network device, a core network device, or an application server. It should be understood that if the terminal device expects to receive the first service that is one of the M services, the terminal device may send a service request for the first service to a network side device. The network side device sends the second configuration information to the terminal device based on the received service request. The network side device herein may be an access network device, a core network device, an application server, or the like.

According to a second aspect, an embodiment of this application provides a method for sending a multicast control channel. The method includes: An access network device sends first configuration information, where the first configuration information indicates N modification periods, and N is an integer greater than 1; and the access network device sends a modification notification of an MCCH based on a modification period corresponding to a first service, where the modification period corresponding to the first service is one of the N modification periods.

Therefore, compared with that in the conventional technology, an SC-MCCH has a unique modification period and a unique repetition period, in the method provided in this embodiment of this application, services having different latency requirements (or latency sensitivities) can correspond to different modification periods, to meet latency requirements of different services and achieve an electricity saving effect of the terminal device.

In a possible design, the first configuration information further includes a classification identifier corresponding to each modification period.

According to the design, the terminal device can determine, based on the classification identifier corresponding to the first service and the first configuration information, a modification period corresponding to the classification identifier as the modification period of the first service.

In a possible design, the first configuration information includes N pieces of MCCH configuration information, the N pieces of MCCH configuration information and N MCCHs are in a one-to-one correspondence, and each piece of MCCH configuration information includes a modification period of a corresponding MCCH and a classification identifier of the corresponding MCCH; or the first configuration information includes the N modification periods of one MCCH and the classification identifier corresponding to each modification period.

According to the design, the first configuration information can indicate the N modification periods in a plurality of possible forms.

In a possible design, the first configuration information includes N pieces of MCCH configuration information and a first modification period, the N pieces of MCCH configuration information and N MCCHs are in a one-to-one correspondence, each piece of MCCH configuration information includes a first coefficient of a corresponding MCCH and a classification identifier of the corresponding MCCH, and a modification period of each MCCH is determined based on the first modification period and the first coefficient that is included in the MCCH configuration information and that is of the corresponding MCCH; or the first configuration information includes a first modification period, N first coefficients, and a classification identifier corresponding to each first coefficient, and the N modification periods are determined based on the first modification period and the N first coefficients.

According to the design, the first configuration information can indicate the N modification periods in a plurality of possible forms.

In a possible design, the method further includes: The access network device receives service configuration information from a core network device, where the service configuration information indicates a latency requirement of M services, M≥N, M is a positive integer, and the first service is one of the M services; and the access network device configures the N modification periods for the M services based on the latency requirement of the M services and sends modification period configuration information to the core network device, where the modification period configuration information is used to indicate a correspondence between the M services and the N modification periods.

According to the design, the core network device and the access network device can have consistent understandings for a modification period corresponding to each service, a modification period corresponding to each classification identifier, and a service corresponding to each classification identifier.

In a possible design, the access network device may configure the N modification periods for the M services based on the latency requirement of the M services by using, but not limited to, the following method:

The access network device divides the M services into N service groups based on the latency requirement of the M services, allocates a classification identifier to each service group, and determines N classification identifiers and a correspondence between the M services and the N classification identifiers; the access network device configures the N modification periods based on the latency requirement of the M services and the correspondence between the M services and the N classification identifiers, where the N classification identifiers and the N modification periods are in a one-to-one correspondence; and the access network device sends the modification period configuration information to the core network device, where the modification period configuration information includes the correspondence between the M services and the N classification identifiers, the N modification periods, and the classification identifier corresponding to each modification period.

According to the design, the core network device and the access network device can have consistent understandings for a modification period corresponding to each service, a modification period corresponding to each classification identifier, and a service corresponding to each classification identifier.

In a possible design, the service configuration information further includes a correspondence between the M services and the N classification identifiers. The access network device may configure the N modification periods for the M services based on the latency requirement of the M services by using, but not limited to, the following method: The access network device configures the N modification periods based on the latency requirement of the M services and the correspondence between the M services and the N classification identifiers, where the N classification identifiers and the N modification periods are in a one-to-one correspondence; and the access network device sends the modification period configuration information to the core network device, where the modification period configuration information includes the N modification periods and the classification identifier corresponding to each modification period.

According to the design, the core network device and the access network device can have consistent understandings for a modification period corresponding to each service, a modification period corresponding to each classification identifier, and a service corresponding to each classification identifier.

In a possible design, the method further includes: The access network device sends second configuration information to the terminal device, where the second configuration information indicates a classification identifier corresponding to the first service.

According to the design, the access network device can send, to the terminal device, a classification identifier corresponding to a service that the terminal device expects to receive.

In a possible design, the first configuration information further indicates N repetition periods, and the N repetition periods and the N modification periods are in a one-to-one correspondence; and the first configuration information further includes bias information, and the bias information is used to determine a location of each repetition period.

It should be understood that for a form in which the first configuration information indicates the N repetition periods, refer to a form in which the first configuration information indicates the N modification periods.

In a possible design, the method further includes: The access network device sends third configuration information, where the third configuration information is used to notify version information of an MCCH transmitted in each repetition period.

According to the design, the terminal device can perform combined reception only on an MCCH having a same version number within one modification period.

According to a third aspect, an embodiment of this application provides a method for sending a multicast control channel. The method includes:

A core network device sends service configuration information to an access network device, where the service configuration information indicates a latency requirement of M services, and M is a positive integer; and the core network device receives modification period configuration information from the access network device, where the modification period configuration information is used to indicate a correspondence between the M services and N modification periods, M≥N, and N is an integer greater than 1.

According to the design, the core network device and the access network device can have consistent understandings for a modification period corresponding to each service, a modification period corresponding to each classification identifier, and a service corresponding to each classification identifier.

In a possible design, the modification period configuration information includes a correspondence between the M services and N classification identifiers, the N modification periods, and a classification identifier corresponding to each modification period.

According to the design, the core network device and the access network device can have consistent understandings for a modification period corresponding to each service, a modification period corresponding to each classification identifier, and a service corresponding to each classification identifier.

In a possible design, the service configuration information further includes the correspondence between the M services and the N classification identifiers. The core network device receives the modification period configuration information from the access network device, where the modification period configuration information includes the N modification periods and the classification identifier corresponding to each modification period.

According to the design, the core network device and the access network device can have consistent understandings for a modification period corresponding to each service, a modification period corresponding to each classification identifier, and a service corresponding to each classification identifier.

In a possible design, the method further includes: The core network device sends second configuration information to a terminal device, where the second configuration information indicates a classification identifier corresponding to a first service.

According to the design, the core network device can send, to the terminal device, a classification identifier corresponding to a service that the terminal device expects to receive.

According to a fourth aspect, an embodiment of this application provides a method for sending a multicast control channel. The method includes: A terminal device receives first configuration information, where the first configuration information includes N pieces of MCCH configuration information, the N pieces of MCCH configuration information and N MCCHs are in a one-to-one correspondence, and each piece of MCCH configuration information corresponds to one QoS requirement; the terminal device determines a first MCCH based on the first configuration information, where the first MCCH is an MCCH corresponding to MCCH configuration information corresponding to a first service; and the terminal device receives information about the first service based on the first MCCH.

Compared with that in the conventional technology, an SC-MCCH has a unique modification period and a unique repetition period, in the method provided in this embodiment of this application, services having different QoS requirements can correspond to different MCCHs, to meet QoS requirements of different services.

In a possible design, the QoS requirement is a reliability requirement or a latency requirement.

In a possible design, each piece of MCCH configuration information includes a classification identifier of a corresponding MCCH. That the terminal device determines a first MCCH based on the first configuration information may mean that the terminal device determines the first MCCH based on a classification identifier corresponding to the first service and the first configuration information.

According to the design, the terminal device can first determine the classification identifier corresponding to the first service, and then determine the first MCCH based on the classification identifier corresponding to the first service and the first configuration information.

In a possible design, the method further includes: The terminal device receives second configuration information, where the second configuration information indicates the classification identifier corresponding to the first service. In addition, the second configuration information further indicates a correspondence between the M services and the N classification identifiers. The correspondence between the M services and the N classification identifiers or the classification identifier corresponding to the first service may be included in the first configuration information or may be a single piece of configuration information (for example, the second configuration information) and is sent separately with the first configuration information.

In a possible design, the second configuration information is received by the terminal device from an access network device, a core network device, or an application server. It should be understood that if the terminal device expects to receive the first service that is one of the M services, the terminal device may send a service request for the first service to a network side device. The network side device sends the second configuration information to the terminal device based on the received service request. The network side device herein may be an access network device, a core network device, an application server, or the like.

According to a fifth aspect, an embodiment of this application provides a method for sending a multicast control channel. The method includes: An access network device sends first configuration information, where the first configuration information includes N pieces of MCCH configuration information, the N pieces of MCCH configuration information and N MCCHs are in a one-to-one correspondence, and each piece of MCCH configuration information corresponds to one QoS requirement; and the access network device sends information about a first service based on a first MCCH, where the first MCCH is an MCCH corresponding to MCCH configuration information corresponding to the first service.

Compared with that in the conventional technology, an SC-MCCH has a unique modification period and a unique repetition period, in the method provided in this embodiment of this application, services having different QoS requirements can correspond to different MCCHs, to meet QoS requirements of different services.

In a possible design, the QoS requirement is a reliability requirement or a latency requirement.

In a possible design, each piece of MCCH configuration information includes a classification identifier of a corresponding MCCH.

In a possible design, the method further includes: The access network device receives service configuration information from a core network device, where the service configuration information indicates a QoS requirement of M services, M≥N, M is a positive integer, and the first service is one of the M services; the access network device configures N MCCHs for the M services based on the QoS requirement of the M services; and the access network device sends fourth configuration information to the core network device, where the fourth configuration information is used to indicate a correspondence between the M services and the N MCCHs.

According to the design, the core network device and the access network device can have consistent understandings for an MCCH corresponding to each service, an MCCH corresponding to each classification identifier, and a service corresponding to each classification identifier.

In a possible design, the access network device may configure the N MCCHs for the M services based on the QoS requirement of the M services by using, but not limited to, the following method:

The access network device divides the M services into N service groups based on the QoS requirement of the M services, allocates a classification identifier to each service group, and determines N classification identifiers and a correspondence between the M services and the N classification identifiers; the access network device configures the N MCCHs based on the QoS requirement of the M services and the correspondence between the M services and the N classification identifiers, where the N classification identifiers and the N MCCHs are in a one-to-one correspondence; and the access network device sends fourth configuration information to the core network device, where the fourth configuration information includes the correspondence between the M services and the N classification identifiers and a correspondence between the N MCCHs and the N classification identifiers.

Alternatively, the service configuration information further includes a correspondence between the M services and N classification identifiers; the access network device configures the N MCCHs based on the QoS requirement of the M services and the correspondence between the M services and the N classification identifiers, where the N classification identifiers and the N MCCHs are in a one-to-one correspondence; and the access network device sends fourth configuration information to the core network device, where the fourth configuration information includes a correspondence between the N MCCHs and the N classification identifiers.

According to the design, the core network device and the access network device can have consistent understandings for an MCCH corresponding to each service, an MCCH corresponding to each classification identifier, and a service corresponding to each classification identifier.

In a possible design, the method further includes: The access network device sends second configuration information to a terminal device, where the second configuration information indicates a classification identifier corresponding to the first service.

According to the design, the access network device can send, to the terminal device, a classification identifier corresponding to a service that the terminal device expects to receive.

According to a sixth aspect, an embodiment of this application provides a method for sending a multicast control channel. The method includes:

A core network device sends service configuration information to an access network device, where the service configuration information indicates a QoS requirement of M services, and M is a positive integer; and the core network device receives fourth configuration information from the access network device, where the fourth configuration information is used to indicate a correspondence between the M services and N MCCHs, M≥N, and N is an integer greater than 1.

According to the design, the core network device and the access network device can have consistent understandings for an MCCH corresponding to each service, an MCCH corresponding to each classification identifier, and a service corresponding to each classification identifier.

In a possible design, the fourth configuration information includes a correspondence between the M services and N classification identifiers and a correspondence between the N MCCHs and the N classification identifiers.

According to the design, the core network device and the access network device can have consistent understandings for an MCCH corresponding to each service, an MCCH corresponding to each classification identifier, and a service corresponding to each classification identifier.

In a possible design, the service configuration information further includes the correspondence between the M services and the N classification identifiers. The core network device receives the fourth configuration information from the access network device, where the fourth configuration information includes the correspondence between the N MCCHs and the N classification identifiers.

According to the design, the core network device and the access network device can have consistent understandings for an MCCH corresponding to each service, an MCCH corresponding to each classification identifier, and a service corresponding to each classification identifier.

In a possible design, the method further includes: The core network device sends second configuration information to a terminal device, where the second configuration information indicates a classification identifier corresponding to a first service.

According to the design, the core network device can send, to the terminal device, a classification identifier corresponding to a service that the terminal device expects to receive.

According to a seventh aspect, an embodiment of this application provides a communications apparatus. The apparatus may be a terminal device, or may be a chip in the terminal device. The apparatus may include a processing unit, a sending unit, and a receiving unit. It should be understood that the sending unit and the receiving unit herein may alternatively be transceiver units. When the apparatus is a terminal device, the processing unit may be a processor, and the sending unit and the receiving unit may be transceivers. The terminal device may further include a storage unit, and the storage unit may be a memory. The storage unit is configured to store instructions. The processing unit executes the instructions stored in the storage unit, so that the terminal device performs the method in the first aspect or any possible design of the first aspect or the method in the fourth aspect or any possible design of the fourth aspect. When the apparatus is a chip in a terminal device, the processing unit may be a processor, and the sending unit and the receiving unit may be input/output interfaces, pins, circuits, or the like. The processing unit executes instructions stored in a storage unit, so that the chip performs the method in the first aspect or any possible design of the first aspect or the method in the fourth aspect or any possible design of the fourth aspect. The storage unit is configured to store instructions. The storage unit may be a storage unit (for example, a register or a cache) in the chip, or may be a storage unit (for example, a read-only memory or a random access memory) that is located in the terminal device and outside the chip.

According to an eighth aspect, an embodiment of this application provides a communications apparatus. The apparatus may be an access network device or a chip in the access network device. The apparatus may include a processing unit, a sending unit, and a receiving unit. It should be understood that the sending unit and the receiving unit herein may alternatively be transceiver units. When the apparatus is a network device, the processing unit may be a processor, and the sending unit and the receiving unit may be transceivers. The network device may further include a storage unit, and the storage unit may be a memory. The storage unit is configured to store instructions. The processing unit executes the instructions stored in the storage unit, so that the network device performs the method in the second aspect or any possible design of the second aspect or the method in the fifth aspect or any possible design of the fifth aspect. When the apparatus is a chip in a network device, the processing unit may be a processor, and the sending unit and the receiving unit may be input/output interfaces, pins, circuits, or the like. The processing unit executes instructions stored in a storage unit, so that the chip performs the method in the second aspect or any possible design of the second aspect or the method in the fifth aspect or any possible design of the fifth aspect. The storage unit is configured to store instructions. The storage unit may be a storage unit (for example, a register or a cache) in the chip, or may be a storage unit (for example, a read-only memory or a random access memory) that is located in the network device and outside the chip.

According to a ninth aspect, an embodiment of this application provides a communications apparatus. The apparatus may be a core network device or a chip in the core network device. The apparatus may include a processing unit, a sending unit, and a receiving unit. It should be understood that the sending unit and the receiving unit herein may alternatively be transceiver units. When the apparatus is a terminal device, the processing unit may be a processor, and the sending unit and the receiving unit may be transceivers. The terminal device may further include a storage unit, and the storage unit may be a memory. The storage unit is configured to store instructions. The processing unit executes the instructions stored in the storage unit, so that the terminal device performs the method in the third aspect or any possible design of the third aspect or the method in the sixth aspect or any possible design of the sixth aspect. When the apparatus is a chip in a terminal device, the processing unit may be a processor, and the sending unit and the receiving unit may be input/output interfaces, pins, circuits, or the like. The processing unit executes instructions stored in a storage unit, so that the chip performs the method in the third aspect or any possible design of the third aspect or the method in the sixth aspect or any possible design of the sixth aspect. The storage unit is configured to store instructions. The storage unit may be a storage unit (for example, a register or a cache) in the chip, or may be a storage unit (for example, a read-only memory or a random access memory) that is located in the terminal device and outside the chip.

According to a tenth aspect, an embodiment of this application further provides a computer-readable storage medium. The computer-readable storage medium stores a computer program. When the computer program is run on a computer, the computer is enabled to perform the method according to the first aspect to the sixth aspect.

According to an eleventh aspect, an embodiment of this application further provides a computer program product including a program. When the computer program product is run on a computer, the computer is enabled to perform the methods in the first aspect to the sixth aspect.

DESCRIPTION OF EMBODIMENTS

The following describes embodiments of this application with reference to the accompanying drawings.

This application is mainly applied to a fifth generation wireless communications system (new radio, NR) system, and may be further applied to other communications systems, for example, a long term evolution (LTE) system, a long term evolution advanced (LTE-Advanced, LTE-A) system, a narrowband-internet of things (NB-IoT) system, a machine type communications (MTC) system, and a future next-generation communications system.

Figure 1:
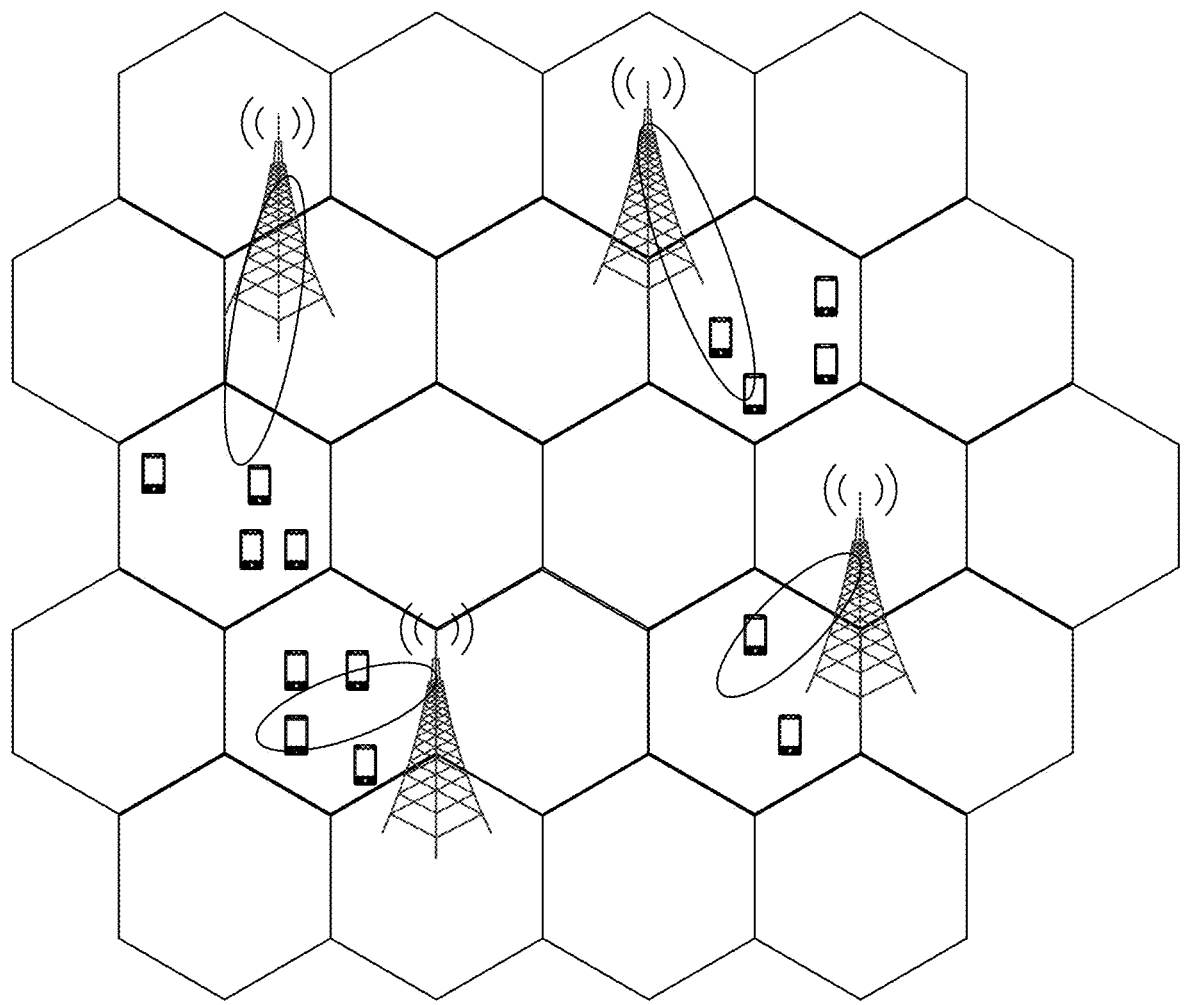
FIG. 1 is a schematic diagram of a scenario of a multicast service in this application.
Figure 2:
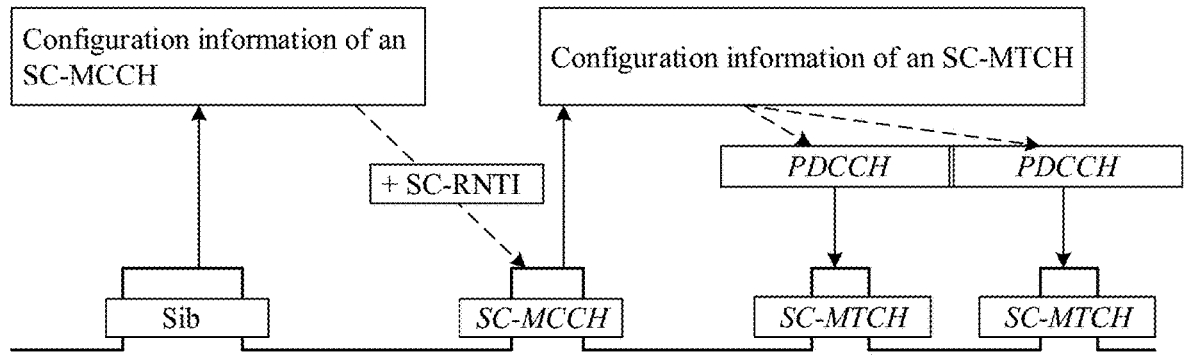
FIG. 2 is a schematic diagram of functions of an SC-MCCH and an SC-MTCH in this application.
Figure 3:
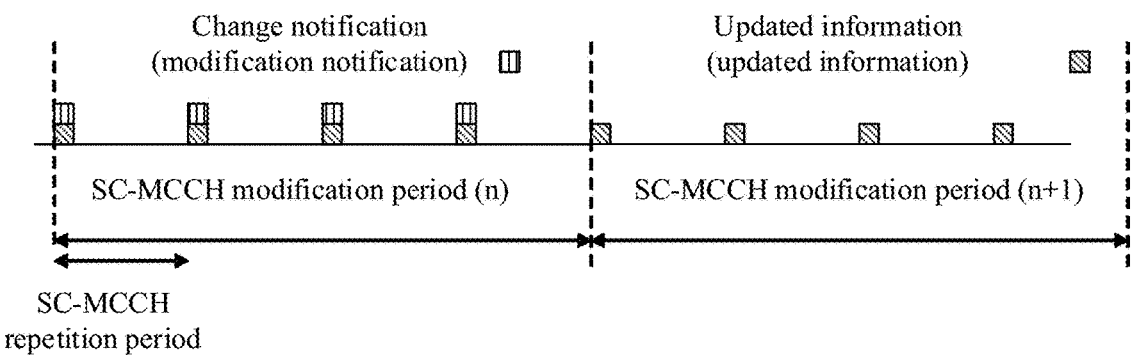
FIG. 3 is a schematic diagram of a modification period mechanism used by an SC-MCCH in this application.
Figure 4:
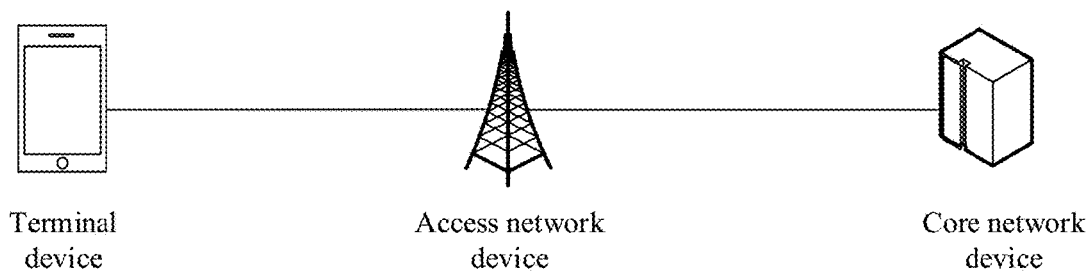
FIG. 4 is a schematic diagram of a structure of a communications system in this application.

Network elements in the embodiments of this application include a terminal device, an access network device, and a core network device. As shown in FIG. 4, the terminal device may be UE, an access terminal, a UE unit, a UE station, a mobile station, a mobile console, a remote station, a remote terminal, a mobile device, a UE terminal, a terminal, a wireless communications device, a UE proxy, a UE apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a future 5G network, a terminal in a future evolved public land mobile network (PLMN) network, or the like.

The access network device is a device that can communicate with the terminal device, and may be a base station, a relay station, or an access point. The base station may be a base transceiver station (BTS) in a global system for mobile communications (GSM) or a code division multiple access (CDMA) network, may be a node base station (NB) in wideband code division multiple access (WCDMA), may be an evolved NB (eNB or eNodeB) in long term evolution (LTE), may be a radio controller in a cloud radio access network (CRAN) scenario, may be a base station device in a future 5G network or an access network device in a future evolved PLMN network, or may be a wearable device or a vehicle-mounted device.

The core network device may be an access network device and correspond to different devices in different systems. For example, the core network device may correspond to a serving general packet radio service (GPRS) support node (serving GPRS support node, SGSN) and/or a gateway GPRS support node (GGSN) in 3G. The core network device may correspond to a mobility management entity (MME) and/or a serving gateway (S-GW) in 4G. The core network device may correspond to an access and mobility management function (AMF) network element, a session management function (SMF) network element, or a user plane function (UPF) network element in 5G.

Figure 5:
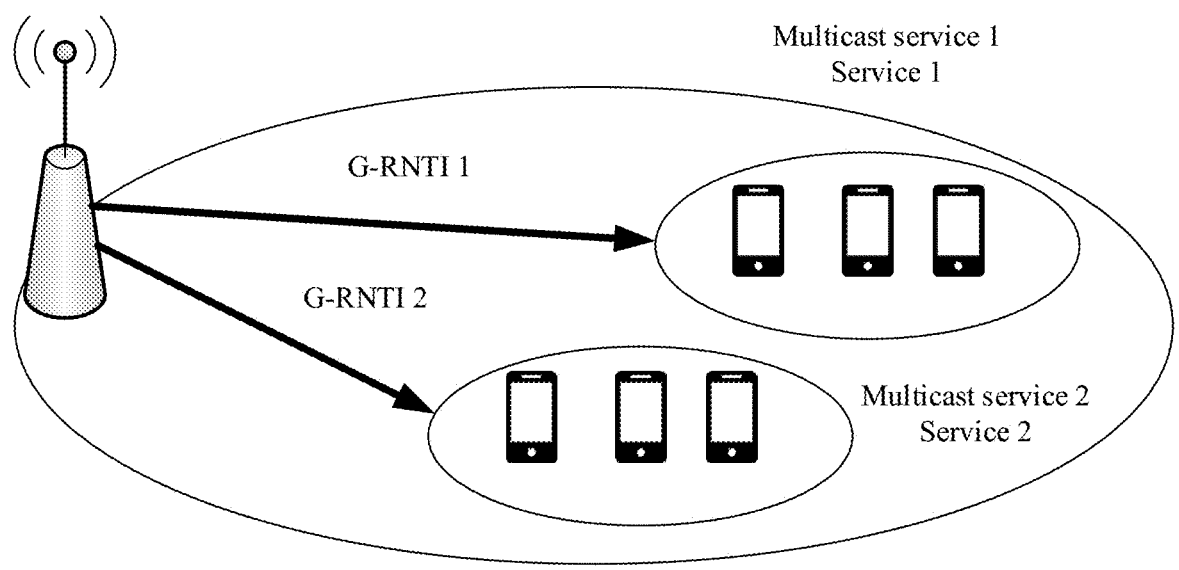
FIG. 5 is a schematic diagram of multicast service transmission in this application.

In SC-PTM, an SC-MCCH and an SC-MTCH are transmitted on a physical downlink shared channel (PDSCH). Different from a PDSCH carrying unicast service data, a PDSCH carrying multicast service data is referred to as a multicast PDSCH. The access network device sends, to a group of UEs in a cell, downlink control information (DCI) carried on a physical downlink control channel (PDCCH), and the group of UEs receives a multicast PDSCH based on the DCI. Specifically, one UE (referred to as UE 1 below) in the group of UEs is used as an example. The UE 1 obtains specific scheduling information of the SC-MCCH and the SC-MTCH on the multicast PDSCH by using a PDCCH scrambled based on a particular RNTI. An RNTI corresponding to the SC-MCCH is an SC-RNTI, and is a fixed value in a protocol. An RNTI corresponding to the SC-MTCH is a G-RNTI. A multicast service is in a one-to-one correspondence with the G-RNTI, and the G-RNTI is configured by using the SC-MCCH. As shown in FIG. 5, the access network device sends DCI to a plurality of UEs. The DCI is carried on a PDCCH scrambled by using a G-RNTI 1. UE receiving the DCI receives, based on the DCI, data of a multicast service 1 corresponding to the G-RNTI 1. Similarly, the access network device sends DCI to a plurality of UEs. The DCI is carried on a PDCCH scrambled by using a G-RNTI 2. UE receiving the DCI receives, based on the DCI, data of a multicast service 2 corresponding to the G-RNTI 2. The multicast service 1 and the multicast service 2 correspond to different SC-MTCHs.

In this application, a latency requirement of a service may be a latency requirement when the terminal device accesses the service when the service is started or a maximum latency when the terminal device accesses the service in a service running process.

The foregoing network elements may be network elements implemented on dedicated hardware, software instances running on the dedicated hardware, or instances of virtualization functions on an appropriate platform. In addition, the embodiments of this application are further applicable to another future-oriented communications technology. The network architecture and the service scenario described in this application are intended to describe the technical solutions in this application more clearly, and do not constitute a limitation on the technical solutions provided in this application. A person of ordinary skill in the art may know that: With the evolution of the network architecture and the emergence of new service scenarios, the technical solutions provided in this application are also applicable to similar technical problems.

Figure 6:
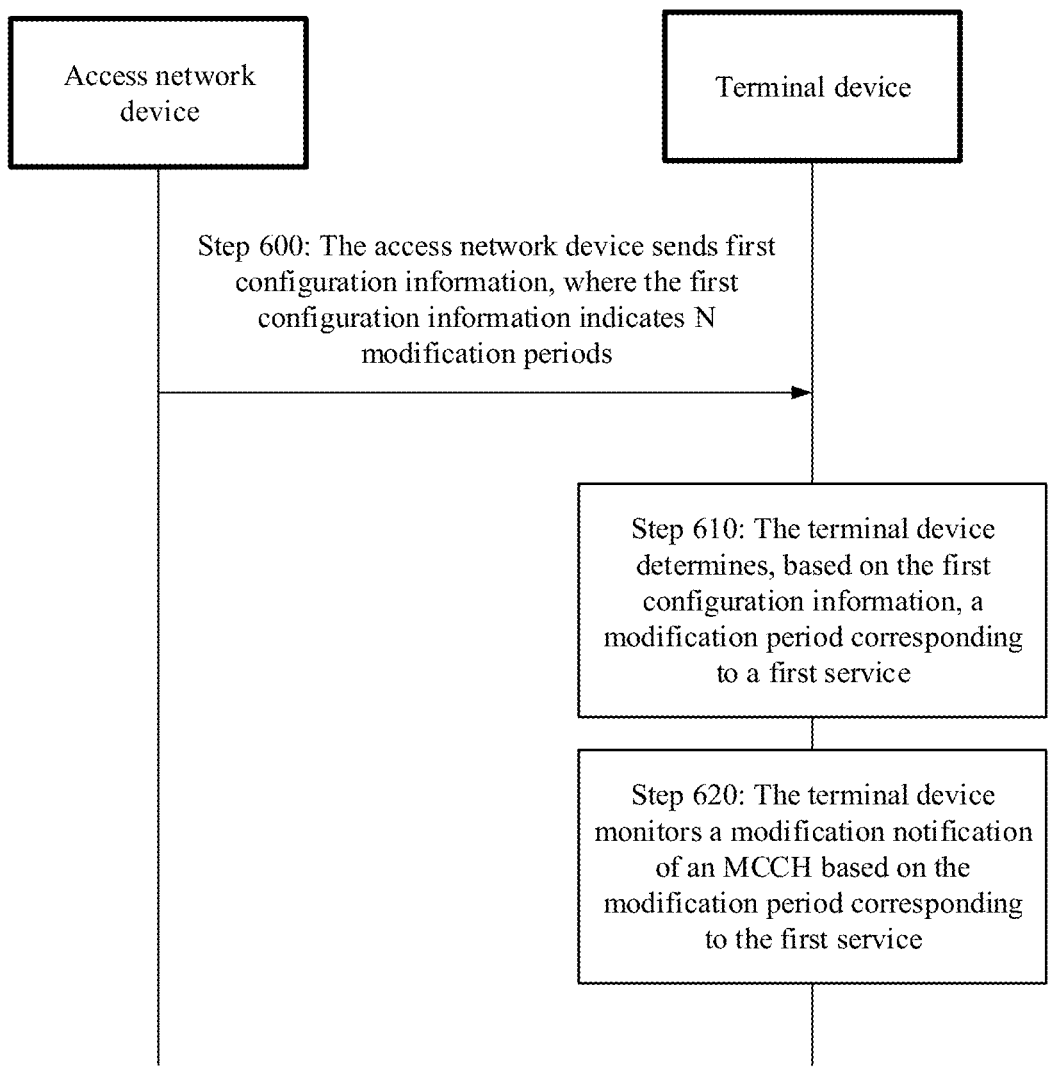
FIG. 6 is an overview flowchart 1 of a method for sending a multicast control channel in this application.

As shown in FIG. 6, an embodiment of this application provides a method for sending a multicast control channel, to resolve a problem that because an SC-MCCH has a unique modification period and a unique repetition period, configurations of the modification period and the repetition period cannot take into account both latency requirements of different multicast services and an electricity saving effect of UE. The method includes the following steps.

Step 600: An access network device sends first configuration information, where the first configuration information indicates N modification periods, and N is an integer greater than 1.

Step 610: A terminal device determines, based on the first configuration information, a modification period corresponding to a first service.

Step 620: The terminal device monitors a modification notification of an MCCH based on the modification period corresponding to the first service.

In a possible design, before the access network device sends the first configuration information, that is, before step 600, a core network device sends service configuration information to the access network device. The service configuration information indicates a latency requirement of M services, M≥N, and M is a positive integer. The access network device configures the N modification periods for the M services based on the latency requirement of the M services, and sends modification period configuration information to the core network device. The modification period configuration information is used to indicate a correspondence between the M services and the N modification periods. The access network device configures N MCCHs for the M services based on the latency requirement of the M services, and configures one modification period for each MCCH, to obtain the N modification periods, or the access network device configures, based on the latency requirement of the M services, that one MCCH has the N modification periods.

From a perspective of the terminal device, the terminal device receives the first configuration information. In another embodiment, receiving in step 600 is replaced by obtaining. That is, the terminal device obtains the first configuration information.

In one example, the access network device configures the N modification periods for the M services based on the latency requirement of the M services, and sends the modification period configuration information to the core network device. The modification period configuration information includes the correspondence between the M services and the N modification periods.

TABLE 1

| Service | Latency requirement | Modification period | Repetition period |
|---|---|---|---|
| Service 1 and service 3 | 40 ms | 40 ms | 20 ms |
| Service 2 | 2560 ms | 2560 ms | 1280 ms |

As shown in Table 1, if the core network device sends the service configuration information to the access network device, where the service configuration information indicates three services, namely, the service 1, the service 2, and the service 3, latency requirements of the service 1 and the service 3 are both 40 ms, and a latency requirement of the service 2 is 2560 ms, the access network device configures an MCCH 1 and an MCCH 2 based on the service configuration information, a modification period of the MCCH 1 is 40 ms, and a modification period of the MCCH 2 is 2560 ms, or the access network device configures, based on the service configuration information, that an MCCH has two modification periods, namely, 40 ms and 2560 ms. The access network device sends the modification period configuration information to the core network device. The modification period configuration information includes that modification periods corresponding to the service 1 and the service 3 are 40 ms, and a modification period corresponding to the service 2 is 2560 ms. There are a plurality of manners for determining and identifying the latency requirements. The latency requirements may be determined based on a configuration or may be associated with service types. In one embodiment, the latency requirements correspond to different latency levels.

In one example, if the service configuration information indicates the latency requirement of the M services but does not include a correspondence between the M services and N classification identifiers, the access network device divides the M services into N service groups based on the latency requirement of the M services, allocates a classification identifier to each service group, and determines the N classification identifiers and the correspondence between the N classification identifiers and the M services. The access network device configures the N modification periods based on the latency requirement of the M services and the correspondence between the N classification identifiers and the M services, and the N modification periods and the N classification identifiers are in a one-to-one correspondence. The access network device configures the N MCCHs based on the latency requirement of the M services and the correspondence between the N classification identifiers and the M services, and configures one modification period for each MCCH, to obtain the N modification periods, or the access network device configures, based on the latency requirement of the M services and the correspondence between the N classification identifiers and the M services, that one MCCH has the N modification periods. The access network device sends the modification period configuration information to the core network device. The modification period configuration information includes the correspondence between the M services and the N classification identifiers, the N modification periods, and a classification identifier corresponding to each modification period.

In another example, if the service configuration information indicates the latency requirement of the M services and includes the correspondence between the M services and the N classification identifiers, the access network device configures the N modification periods based on the latency requirement of the M services and the correspondence between the M services and the N classification identifiers. The N modification periods and the N classification identifiers are in a one-to-one correspondence. The access network device configures the N MCCHs based on the latency requirement of the M services and the correspondence between the M services and the N classification identifiers, and configures one modification period for each MCCH, to obtain the N modification periods, or the access network device configures, based on the latency requirement of the M services and the correspondence between the M services and the N classification identifiers, that one MCCH has the N modification periods. The access network device sends the modification period configuration information to the core network device. The modification period configuration information includes the N modification periods, and the classification identifier corresponding to each modification period.

Optionally, the core network device, the access network device, or an application server further sends the correspondence between the M services and the N classification identifiers to the terminal device. Alternatively, if the terminal device expects to receive the first service, where the first service is one of the M services, the terminal device may send a service request for the first service to the core network device, and the core network device sends, to the terminal device, a classification identifier corresponding to the first service. Alternatively, the terminal device may send a service request for the first service to the access network device, and the access network device sends, to the terminal device, a classification identifier corresponding to the first service. Alternatively, the terminal device may send a service request for the first service to the application server, and the application server sends, to the terminal device, a classification identifier corresponding to the first service. The correspondence between the M services and the N classification identifiers or the classification identifier corresponding to the first service may be included in the first configuration information or may be a single piece of configuration information (for example, second configuration information) and is sent separately with the first configuration information.

TABLE 2

| Service | Latency requirement | Modification period | Repetition period | Classification identifier |
| --- | --- | --- | --- | --- |
| Service 1 and service 3 | 40 ms | 40 ms | 20 ms | 1 |
| Service 2 | 2560 ms | 2560 ms | 1280 ms | 2 |

As shown in Table 2, the core network device sends the service configuration information to the access network device, where the service configuration information indicates three services, namely, the service 1, the service 2, and the service 3, the latency requirements of the service 1 and the service 3 are both 40 ms, and the latency requirement of the service 2 is 2560 ms. In this case, the access network device may divide, based on the service configuration information, the three services into two service groups to which two classification identifiers are allocated. The service 1 and the service 3 form one service group, corresponding to a classification identifier 1. The service 2 alone forms one service group, corresponding to a classification identifier 2. Further, the access network device configures that a modification period corresponding to the classification identifier 1 is 40 ms, and a modification period corresponding to the classification identifier 2 is 2560 ms. For example, the access network device configures the MCCH 1 and the MCCH 2. The modification period of the MCCH 1 is 40 ms, that is, the modification period corresponding to the classification identifier 1 is 40 ms. The modification period of the MCCH 2 is 2560 ms, that is, the modification period corresponding to the classification identifier 2 is 2560 ms. Alternatively, the access network device configures that an MCCH has two modification periods, namely, 40 ms and 2560 ms, that is, the modification period corresponding to the classification identifier 1 is 40 ms, and the modification period corresponding to the classification identifier 2 is 2560 ms. The access network device sends, to the core network device, the classification identifier 1 corresponding to the service 1 and the service 3, the classification identifier 2 corresponding to the service 2, the modification period 40 ms corresponding to the classification identifier 1, and the modification period 2560 ms corresponding to the classification identifier 2.

As shown in Table 2, the core network device sends the service configuration information to the access network device, where the service configuration information indicates three services, namely, the service 1, the service 2, and the service 3, the latency requirements of the service 1 and the service 3 are both 40 ms, the latency requirement of the service 2 is 2560 ms, the service 1 and the service 3 correspond to the classification identifier 1, and the service 2 corresponds to the classification identifier 2. In this case, the access network device configures, based on the service configuration information, that the modification period corresponding to the classification identifier 1 is 40 ms, and the modification period corresponding to the classification identifier 2 is 2560 ms. For example, the access network device configures the MCCH 1 and the MCCH 2. The modification period of the MCCH 1 is 40 ms, that is, the modification period corresponding to the classification identifier 1 is 40 ms. The modification period of the MCCH 2 is 2560 ms, that is, the modification period corresponding to the classification identifier 2 is 2560 ms. Alternatively, the access network device configures that an MCCH has two modification periods, namely, 40 ms and 2560 ms, that is, the modification period corresponding to the classification identifier 1 is 40 ms, and the modification period corresponding to the classification identifier 2 is 2560 ms. The access network device sends, to the core network device, the modification period 40 ms corresponding to the classification identifier 1 and the modification period 2560 ms corresponding to the classification identifier 2.

According to the design, the access network device may configure different modification periods for services having different latency requirements (or latency sensitivities), and the core network device and the access network device have consistent understandings for a modification period corresponding to each service, a modification period corresponding to each classification identifier, and a service corresponding to each classification identifier. It should be understood that based on a same idea, the access network device may simultaneously configure N repetition periods for the M services, and the N modification periods and the N repetition periods are in a one-to-one correspondence. Repeated content is not described again.

Based on this, the embodiment shown in FIG. 6 may be specifically applied to the two following specific scenarios. How the first configuration information indicates the N modification periods and how the terminal device determines, based on the first configuration information, the modification period corresponding to the first service, and monitors the modification notification of the MCCH based on the modification period corresponding to the first service are separately described below by way of example by using the two scenarios.

Figure 7:
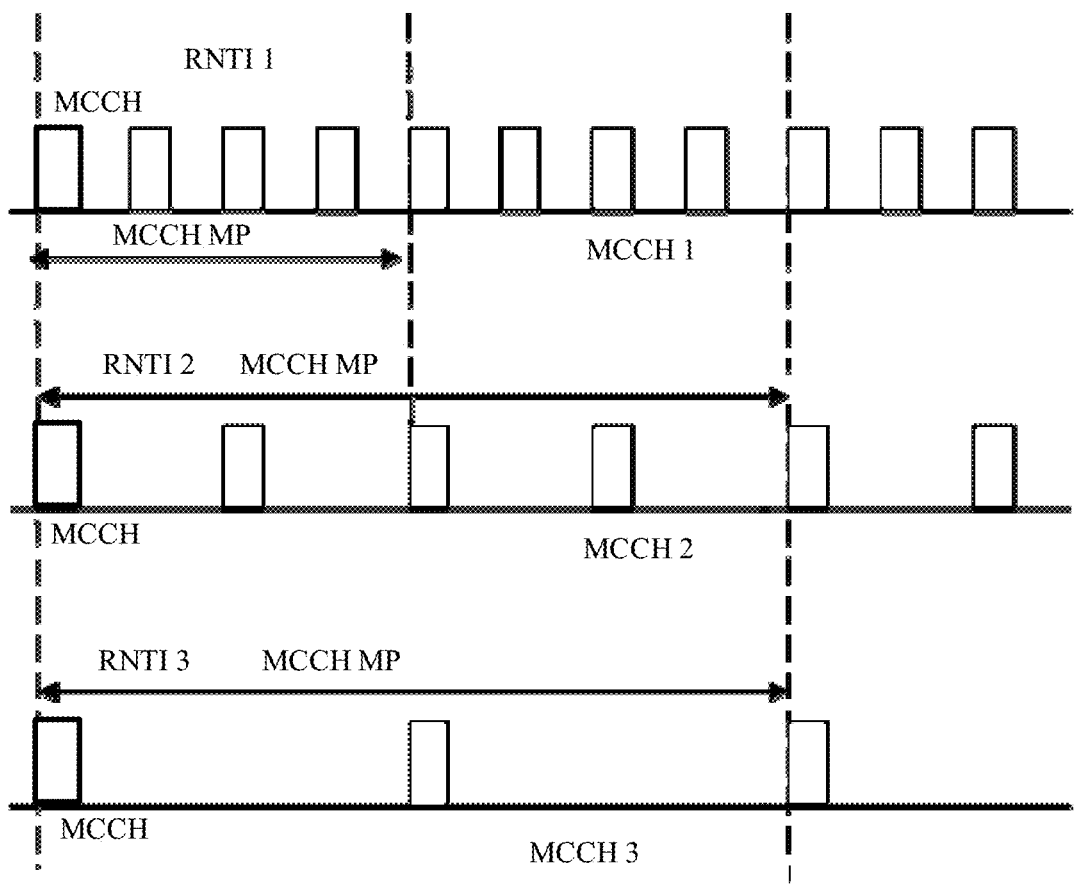
FIG. 7 is a schematic diagram in which a plurality of MCCHs correspond to a plurality of modification periods in this application.

Scenario 1: The access network device may configure the N MCCHs, and the N MCCHs and the N modification periods are in a one-to-one correspondence. As shown in FIG. 7, the access network device configures three MCCHs, namely, an MCCH 1, an MCCH 2, and an MCCH 3. The MCCH 1 corresponds to an RNTI 1, the MCCH 2 corresponds to an RNTI 2, the MCCH 3 corresponds to an RNTI 3, a modification period (MP) of the MCCH 1 is a half of a modification period of the MCCH 2, and a repetition period of the MCCH 1 is a half of a repetition period of the MCCH 2. The modification period of the MCCH 2 is the same as a modification period of the MCCH 3, and the repetition period of the MCCH 2 is a half of a repetition period of the MCCH 3.

Example 1: The first configuration information may include N pieces of MCCH configuration information, the N pieces of MCCH configuration information and the N MCCHs are in a one-to-one correspondence, and each piece of MCCH configuration information includes a modification period of a corresponding MCCH and a service identifier of the corresponding MCCH. The terminal device may receive a service identifier of the first service from the access network device, the core network device, or the application server. The terminal device may determine, based on the service identifier of the first service and the first configuration information, the modification period corresponding to the first service and MCCH configuration information corresponding to the first service. The terminal device monitors, based on the modification period corresponding to the first service, a modification notification of an MCCH corresponding to the MCCH configuration information. If the terminal device detects the modification notification, the terminal device further receives, based on the MCCH configuration information, a message carried in the MCCH corresponding to the MCCH configuration information, determines whether the message includes information about the first service, and if the message includes the information about the first service, reads the information about the first service.

As shown in Table 1, the first configuration information includes two pieces of MCCH configuration information. One piece of configuration information corresponds to the MCCH 1, and configuration information of the MCCH 1 includes the modification period 40 ms, a service identifier of the service 1, and a service identifier of the service 3. The other piece of configuration information corresponds to the MCCH 2, and configuration information of the MCCH 2 includes the modification period 2560 ms and a service identifier of the service 2. If the UE expects to receive the service 1, the UE sends a service request for the service 1 to the core network device. The UE may receive the service identifier of the service 1 from the core network device and may determine, based on the service identifier of the service 1 and the first configuration information, the modification period 40 ms corresponding to the service 1 and the configuration information of the MCCH 1. The UE monitors a modification notification of the MCCH 1 based on the modification period 40 ms. If the UE detects the modification notification, the UE receives, based on the configuration information of the MCCH 1, a message carried in the MCCH 1. If the message carried in the MCCH 1 includes information about the service 1, the UE reads the information about the service 1.

Example 2: The first configuration information includes N pieces of MCCH configuration information and a first modification period, the N pieces of MCCH configuration information and the N MCCHs are in a one-to-one correspondence, and each piece of MCCH configuration information includes a first coefficient of a corresponding MCCH and a service identifier of the corresponding MCCH. The first modification period may be configured by the access network device through higher layer signaling or may be predefined in a protocol, that is, does not need to be configured by the access network device so that the terminal device is notified of the first modification period or the first modification period is indicated to the terminal device. The terminal device may receive the service identifier of the first service from the access network device, the core network device, or the application server. The terminal device may determine, based on the service identifier of the first service and the first configuration information, the MCCH configuration information corresponding to the first service and a first coefficient corresponding to the first service, and determine, based on the first coefficient corresponding to the first service and the first modification period, the modification period corresponding to the first service. The terminal device monitors, based on the modification period corresponding to the first service, a modification notification of an MCCH corresponding to the MCCH configuration information. If the terminal device detects the modification notification, the terminal device further receives, based on the MCCH configuration information, a message carried in the MCCH corresponding to the MCCH configuration information, determines whether the message includes information about the first service, and if the message includes the information about the first service, reads the information about the first service.

TABLE 3

| Service | Latency requirement | Modification period | Repetition period | First coefficient |
|---|---|---|---|---|
| Service 1 and service 3 | 40 ms | 40 ms | 20 ms | 1/64 |
| Service 2 | 2560 ms | 2560 ms | 1280 ms | 1 |

As shown in Table 3, the first configuration information includes two pieces of MCCH configuration information and a first modification period 2560 ms. One piece of configuration information corresponds to the MCCH 1, and configuration information of the MCCH 1 includes a first coefficient 1/64, a service identifier of the service 1, and a service identifier of the service 3. The other piece of configuration information corresponds to the MCCH 2, and configuration information of the MCCH 2 includes a first coefficient 1 and a service identifier of the service 2. If the UE expects to receive the service 1, the UE sends a service request for the service 1 to the core network device. The UE may receive the service identifier of the service 1 from the core network device and may determine, based on the service identifier corresponding to the service 1 and the first configuration information, the first coefficient 1/64 corresponding to the service 1 and the configuration information of the MCCH 1, to determine that a modification period corresponding to the service 1 is 2560*(1/64)=40 ms. The UE monitors a modification notification of the MCCH 1 based on the modification period 40 ms. If the UE detects the modification notification, the UE receives, based on the configuration information of the MCCH 1, a message carried in the MCCH 1. If the message carried in the MCCH 1 includes information about the service 1, the UE reads the information about the service 1.

Example 3: The first configuration information includes N pieces of MCCH configuration information, the N pieces of MCCH configuration information and the N MCCHs are in a one-to-one correspondence, and each piece of MCCH configuration information includes a modification period of a corresponding MCCH and a classification identifier of the corresponding MCCH. The terminal device may receive second configuration information from the access network device, the core network device, or the application server. The second configuration information may indicate the classification identifier corresponding to the first service. The terminal device determines, based on the classification identifier corresponding to the first service and the first configuration information, the MCCH configuration information corresponding to the first service and the modification period corresponding to the first service. The terminal device monitors, based on the modification period corresponding to the first service, a modification notification of an MCCH corresponding to the MCCH configuration information. If the terminal device detects the modification notification, the terminal device further receives, based on the MCCH configuration information, a message carried in the MCCH corresponding to the MCCH configuration information, determines whether the message includes information about the first service, and if the message includes the information about the first service, reads the information about the first service.

As shown in Table 2, the first configuration information includes two pieces of MCCH configuration information. One piece of configuration information corresponds to the MCCH 1, and configuration information of the MCCH 1 includes the modification period 40 ms and a classification identifier 1. The other piece of configuration information corresponds to the MCCH 2, and configuration information of the MCCH 2 includes the modification period 2560 ms and a classification identifier 2. If the UE expects to receive the service 1, the UE sends a service request for the service 1 to the core network device. The UE may receive the second configuration information from the core network device, where the second configuration information may indicate that a classification identifier corresponding to the service 1 is the classification identifier 1. In this case, the UE determines, based on the second configuration information, that the classification identifier corresponding to the service 1 is the classification identifier 1 and may further determine, based on the classification identifier 1 and the first configuration information, the modification period 40 ms corresponding to the service 1 and the configuration information of the MCCH 1, and the UE monitors a modification notification of the MCCH 1 based on the modification period 40 ms. If the UE detects the modification notification, the UE receives, based on the configuration information of the MCCH 1, a message carried in the MCCH 1. If the message carried in the MCCH 1 includes information about the service 1, the UE reads the information about the service 1.

Example 4: The first configuration information includes configuration information of the N MCCHs, the N pieces of MCCH configuration information and the N MCCHs are in a one-to-one correspondence, and each piece of MCCH configuration information includes a modification period of a corresponding MCCH. The terminal device may receive a latency requirement of the first service from the access network device, the core network device, or the application server. The terminal device determines, based on the latency requirement of the first service and the first configuration information, the MCCH configuration information corresponding to the first service and the modification period corresponding to the first service. The terminal device monitors, based on the modification period corresponding to the first service, a modification notification of an MCCH corresponding to the MCCH configuration information. If the terminal device detects the modification notification, the terminal device further receives, based on the MCCH configuration information, a message carried in the MCCH corresponding to the MCCH configuration information, determines whether the message includes information about the first service, and if the message includes the information about the first service, reads the information about the first service.

As shown in Table 1, the first configuration information includes two pieces of MCCH configuration information. One piece of configuration information corresponds to the MCCH 1, and configuration information of the MCCH 1 includes the modification period 40 ms. The other piece of configuration information corresponds to the MCCH 2, and configuration information of the MCCH 2 includes the modification period 2560 ms. The UE may receive a latency requirement 40 ms of the service 1 from the core network device. In this way, the UE determines that a modification period corresponding to the MCCH 1 can meet the latency requirement, and a modification period corresponding to the MCCH 2 cannot meet the latency requirement, and then, the UE determines that an MCCH corresponding to the service 1 is the MCCH 1. The UE monitors a modification notification of the MCCH 1 based on the modification period 40 ms. If the UE detects the modification notification, the UE receives, based on the configuration information of the MCCH 1, a message carried in the MCCH 1. If the message carried in the MCCH 1 includes information about the service 1, the UE reads the information about the service 1.

Example 5: The first configuration information includes N pieces of MCCH configuration information and a first modification period, the N pieces of MCCH configuration information and the N MCCHs are in a one-to-one correspondence, and each piece of MCCH configuration information includes a first coefficient of a corresponding MCCH and a classification identifier of the corresponding MCCH. A modification period of each MCCH is determined based on the first modification period and the first coefficient that is included in the MCCH configuration information and that is of the corresponding MCCH. The first modification period may be configured by the access network device through higher layer signaling or may be predefined in a protocol, that is, does not need to be configured by the access network device so that the terminal device is notified of the first modification period or the first modification period is indicated to the terminal device. The terminal device may receive second configuration information from the access network device, the core network device, or the application server. The second configuration information may indicate the classification identifier corresponding to the first service. The terminal device determines, based on the second configuration information, the classification identifier corresponding to the first service, and determines, based on the classification identifier corresponding to the first service, the first coefficient corresponding to the classification identifier, and the terminal device determines, based on the first coefficient corresponding to the classification identifier and the first modification period, the modification period corresponding to the first service and the MCCH configuration information corresponding to the first service. The terminal device monitors, based on the modification period corresponding to the first service, a modification notification of an MCCH corresponding to the MCCH configuration information. If the terminal device detects the modification notification, the terminal device further receives, based on the MCCH configuration information, a message carried in the MCCH corresponding to the MCCH configuration information, determines whether the message includes information about the first service, and if the message includes the information about the first service, reads the information about the first service.

TABLE 4

| Service | Latency requirement | Modification period | Repetition period | First coefficient | Classification identifier |
|---|---|---|---|---|---|
| Service 1 | 40 ms | 40 ms | 20 ms | 1/64 | 1 |
| Service 3 | | | | | |
| Service 2 | 2560 ms | 2560 ms | 1280 ms | 1 | 2 |

As shown in Table 4, the first configuration information includes two pieces of MCCH configuration information and a first modification period 2560 ms. One piece of configuration information corresponds to the MCCH 1, and configuration information of the MCCH 1 includes a first coefficient 1/64 and a classification identifier 1. The other piece of configuration information corresponds to the MCCH 2, and configuration information of the MCCH 2 includes a first coefficient 1 and a classification identifier 2. If the UE expects to receive the service 1, the UE sends a service request for the service 1 to the core network device. The UE may receive the second configuration information from the core network device, where the second configuration information may indicate that a classification identifier corresponding to the service 1 is the classification identifier 1. In this case, the UE may determine, based on the classification identifier 1 corresponding to the service 1, the first coefficient 1/64 corresponding to the classification identifier 1 corresponding to the service 1, to obtain, based on the first modification period, the modification period 40 ms corresponding to the service 1 and the configuration information of the MCCH 1, and the UE monitors a modification notification of the MCCH 1 based on the modification period 40 ms. If the UE detects the modification notification, the UE receives, based on the configuration information of the MCCH 1, a message carried in the MCCH 1. If the message carried in the MCCH 1 includes information about the service 1, the UE reads the information about the service 1.

Figure 8:
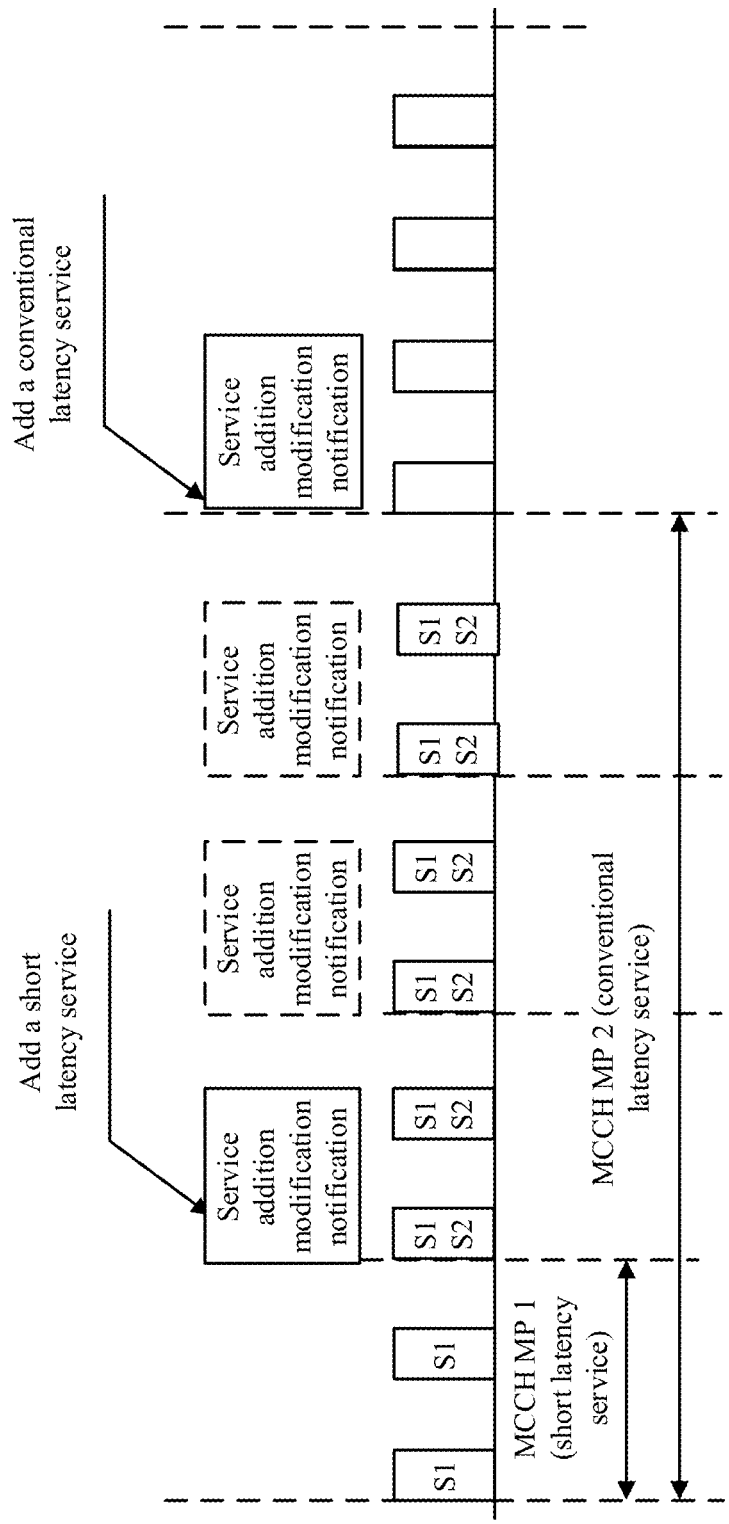
FIG. 8 is a schematic diagram in which one MCCH corresponds to a plurality of modification periods in this application.

Scenario 2: The access network device may configure one MCCH, and the MCCH may specifically include the N modification periods. As shown in FIG. 8, one MCCH has two modification periods, including an MCCH MP 1 and an MCCH MP 2, respectively used for a short latency service and a conventional latency service. A modification period of the conventional latency service is four times a modification period of the short latency service.

Example 1: The first configuration information includes the N modification periods of one MCCH and a service identifier corresponding to each modification period. The terminal device may receive the service identifier of the first service from the access network device, the core network device, or the application server. The terminal device may determine, based on the service identifier of the first service and the first configuration information, the modification period corresponding to the first service and monitor a modification notification of the MCCH based on the modification period corresponding to the first service. If the terminal device detects the modification notification, the terminal device further receives a message carried in the MCCH, determines whether the message includes information about the first service, and if the message includes the information about the first service, reads the information about the first service.

As shown in Table 1, the first configuration information includes the modification period 40 ms, a service identifier of the service 1 corresponding to the modification period 40 ms, a service identifier of the service 3 corresponding to the modification period 40 ms, the modification period 2560 ms, and a service identifier of the service 2 corresponding to the modification period 2560 ms. If the UE expects to receive the service 3, the UE sends a service request for the service 3 to the core network device. The UE may receive the service identifier of the service 3 from the core network device. In this case, the UE may determine, based on the service identifier corresponding to the service 3 and the first configuration information, the modification period 40 ms corresponding to the service 3, and the UE monitors a modification notification of the MCCH based on the modification period 40 ms. If the UE detects the modification notification, the UE receives a message carried in the MCCH. If the message carried in the MCCH includes information about the service 3, the UE reads the information about the service 3.

Example 2: The first configuration information includes a first modification period, N first coefficients, and a service identifier corresponding to each first coefficient. The first modification period may be configured by the access network device through higher layer signaling or may be predefined in a protocol, that is, does not need to be configured by the access network device so that the terminal device is notified of the first modification period or the first modification period is indicated to the terminal device. The terminal device may receive the service identifier of the first service from the access network device, the core network device, or the application server. The terminal device may determine, based on the service identifier of the first service and the first configuration information, a first coefficient corresponding to the first service, and determine, based on the first coefficient corresponding to the first service and the first modification period, the modification period corresponding to the first service. The terminal device monitors a modification notification of the MCCH based on the modification period corresponding to the first service. If the terminal device detects the modification notification, the terminal device further receives a message carried in the MCCH, determines whether the message includes information about the first service, and if the message includes the information about the first service, reads the information about the first service.

As shown in Table 3, the first configuration information includes the first modification period 2560 ms, the first coefficient 1/64, a service identifier of the service 1 corresponding to the first coefficient 1/64, a service identifier of the service 3 corresponding to the first coefficient 1/64, the first coefficient 1, and a service identifier of the service 2 corresponding to the first coefficient 1. If the UE expects to receive the service 2, the UE sends a service request for the service 2 to the core network device. The UE may receive the service identifier of the service 2 from the core network device. In this case, the UE may determine, based on the service identifier of the service 2 and the first configuration information, the first coefficient 1 corresponding to the service 2, to determine the modification period 2560 ms corresponding to the service 2, and the UE monitors a modification notification of the MCCH based on the modification period 2560 ms. If the UE detects the modification notification, the UE receives a message carried in the MCCH. If the message carried in the MCCH includes information about the service 2, the UE reads the information about the service 2.

Example 3: The first configuration information includes the N modification periods of one MCCH and a classification identifier corresponding to each modification period. The terminal device may receive second configuration information from the access network device, the core network device, or the application server. The second configuration information may indicate the classification identifier corresponding to the first service. The terminal device determines, based on the second configuration information, the classification identifier corresponding to the first service and determines, based on the classification identifier corresponding to the first service and the first configuration information, the modification period corresponding to the first service. The terminal device monitors a modification notification of the MCCH based on the modification period corresponding to the first service. If the terminal device detects the modification notification, the terminal device further receives a message carried in the MCCH, determines whether the message includes information about the first service, and if the message includes the information about the first service, reads the information about the first service.

As shown in Table 2, the first configuration information includes the modification period 40 ms, a classification identifier 1 corresponding to the modification period 40 ms, the modification period 2560 ms, and a classification identifier 2 corresponding to the modification period 2560 ms. If the UE expects to receive the service 3, the UE sends a service request for the service 3 to the core network device. The UE may receive the classification identifier of the service 3 from the core network device, where the classification identifier of the service 3 is the classification identifier 1. In this case, the UE may determine, based on the classification identifier 1, the modification period 40 ms corresponding to the service 3, and the UE monitors a modification notification of the MCCH based on the modification period 40 ms. If the UE detects the modification notification, the UE receives a message carried in the MCCH. If the message carried in the MCCH includes information about the service 3, the UE reads the information about the service 3.

Example 4: The first configuration information includes the N modification periods of one MCCH. The terminal device may receive the latency requirement of the first service from the access network device, the core network device, or the application server, and the terminal device determines, based on the latency requirement of the first service and the first configuration information, the modification period corresponding to the first service. The terminal device monitors a modification notification of the MCCH based on the modification period corresponding to the first service. If the terminal device detects the modification notification, the terminal device further receives a message carried in the MCCH, determines whether the message includes information about the first service, and if the message includes the information about the first service, reads the information about the first service.

As shown in Table 1, the first configuration information includes the modification period 40 ms and the modification period 2560 ms. The UE may receive the latency requirement 40 ms of the service 1 from the access network device or the core network device. That the UE selects the modification period 40 ms or a modification period closest to the modification period 40 ms as the modification period corresponding to the service 1 may also be understood as that the UE selects a modification period that can meet the latency requirement of the service 1 as the modification period corresponding to the service 1. Herein, the UE determines, based on the first configuration information, the modification period 40 ms corresponding to the service 1, and the UE monitors a modification notification of the MCCH based on the modification period 40 ms. If the UE detects the modification notification, the UE receives a message carried in the MCCH. If the message carried in the MCCH includes information about the service 1, the UE reads the information about the service 1.

Example 5: The first configuration information includes a first modification period, N first coefficients, and a classification identifier corresponding to each first coefficient. The N modification periods are determined based on the first modification period and the N first coefficients. The first modification period may be configured by the access network device through higher layer signaling or may be predefined in a protocol, that is, does not need to be configured by the access network device so that the terminal device is notified of the first modification period or the first modification period is indicated to the terminal device. The terminal device may receive second configuration information from the access network device, the core network device, or the application server. The second configuration information may indicate the classification identifier corresponding to the first service. The terminal device determines, based on the second configuration information, the classification identifier corresponding to the first service, and determines, based on the classification identifier corresponding to the first service, the first coefficient corresponding to the classification identifier, and the terminal device determines, based on the first coefficient corresponding to the classification identifier and the first modification period, the modification period corresponding to the first service. The terminal device monitors a modification notification of the MCCH based on the modification period corresponding to the first service. If the terminal device detects the modification notification, the terminal device further receives a message carried in the MCCH, determines whether the message includes information about the first service, and if the message includes the information about the first service, reads the information about the first service.

As shown in Table 4, the first configuration information includes the first modification period 2560 ms, the first coefficient 1/64, a classification identifier 1 corresponding to the first coefficient 1/64, the first coefficient 1, and a classification identifier 2 corresponding to the first coefficient 1. If the UE expects to receive the service 1, the UE sends a service request for the service 1 to the core network device. The UE may receive the second configuration information from the core network device, where the second configuration information may indicate that a classification identifier corresponding to the service 1 is the classification identifier 1. In this case, the UE may determine, based on the classification identifier 1 corresponding to the service 1, the first coefficient 1/64 corresponding to the classification identifier 1 corresponding to the service 1, to obtain, based on the first modification period, the modification period 40 ms corresponding to the service 1. The UE monitors a modification notification of the MCCH based on the modification period 40 ms. If the UE detects the modification notification, the UE receives a message carried in the MCCH. If the message carried in the MCCH includes information about the service 1, the UE reads the information about the service 1.

It should be understood that the example 1 to the example 5 corresponding to the scenario 1 and the example 1 to the example 5 corresponding to the scenario 2 are merely examples and do not constitute a limitation on this application. The first configuration information may indicate the N modification periods in another form or in another variation. In addition, based on a same idea, the first configuration information further indicates the N repetition periods, and the N repetition periods and the N modification periods are in a one-to-one correspondence. For various possible forms in which the first configuration information indicates the N repetition periods, refer to the foregoing content, and repeated content is not described again. In addition, the first configuration information further includes bias information, and the bias information is used to determine a location of each repetition period.

Particularly, in the scenario 2, in the conventional technology, the UE reads the message carried in the MCCH within different repetition periods of one modification period. Because content of these messages is the same, the UE may perform combined reception on messages sent within different repetition periods, to increase a decoding success rate. In the scenario 2, because one MCCH includes a plurality of different modification periods, and the plurality of different modification periods may correspond to a plurality of different repetition periods, content transmitted in each repetition period may change. The UE cannot directly consider that combined reception can be performed on messages sent within all repetition periods within a modification period. In this case, the access network device may send third configuration information to the terminal device. The third configuration information may be used to notify version information of an MCCH transmitted in each repetition period. The version information of the MCCH may be used to indicate a version number, within one modification period, of the MCCH transmitted on the repetition period. Within one modification period, repetition periods having a same version number may be considered as repetition periods within which same content is sent. The terminal device may perform combined reception on the repetition periods having the same version number. Therefore, the terminal device may determine, based on the third configuration information, the repetition period used to perform combined reception on the MCCH, that is, the terminal device performs combined reception only on MCCHs having a same version number within one modification period.

Figure 9:
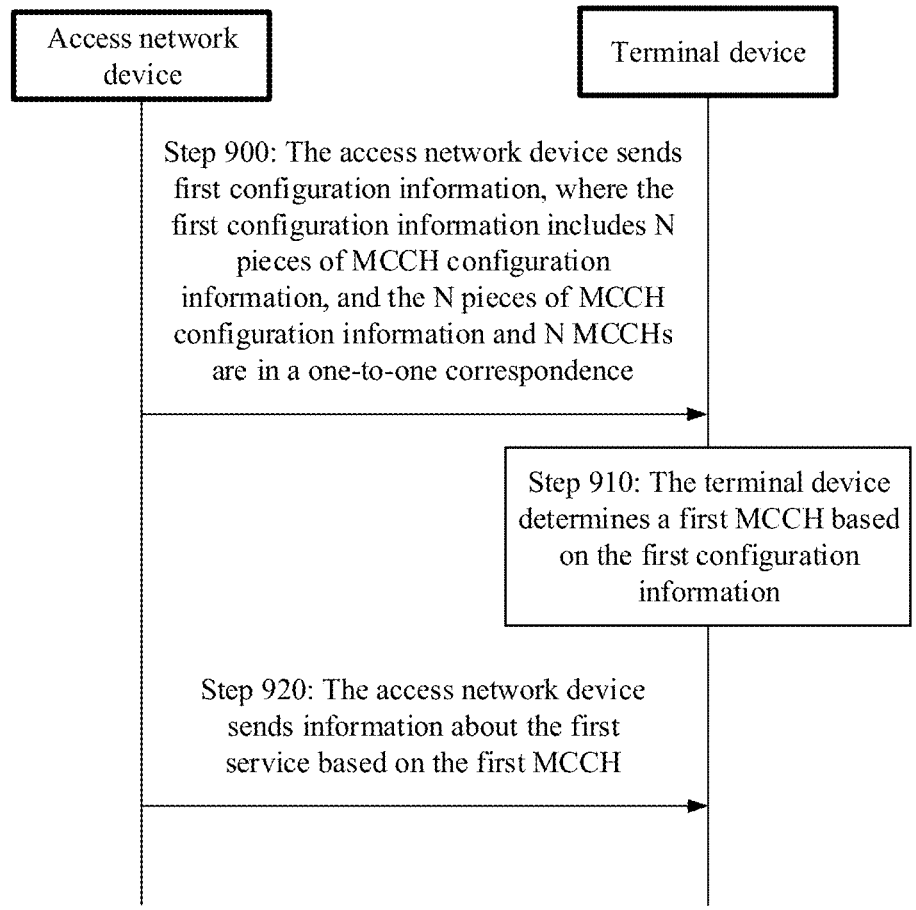
FIG. 9 is an overview flowchart 2 of a method for sending a multicast control channel in this application.

Based on a same idea, as shown in FIG. 9, an embodiment of this application provides a method for sending a multicast control channel, to configure different MCCHs for services having different quality of service (QoS) requirements.

Step 900: An access network device sends first configuration information, where the first configuration information includes N pieces of MCCH configuration information, the N pieces of MCCH configuration information and N MCCHs are in a one-to-one correspondence, and each piece of MCCH configuration information corresponds to one QoS requirement.

Step 910: A terminal device determines a first MCCH based on the first configuration information, where the first MCCH is an MCCH corresponding to MCCH configuration information corresponding to a first service.

Step 920: The access network device sends information about the first service based on the first MCCH.

In a possible design, the QoS requirement may be a reliability requirement or a latency requirement.

In a possible design, each piece of MCCH configuration information includes a classification identifier of a corresponding MCCH. The access network device, a core network device, or an application server may further send second configuration information to the terminal device. The second configuration information indicates a classification identifier corresponding to the first service. Therefore, the terminal device may determine, based on the second configuration information, the classification identifier corresponding to the first service, and determine, based on the classification identifier corresponding to the first service and the first configuration information, the MCCH configuration information corresponding to the first service and a first MCCH. Further, if the terminal device detects a modification notification of the first MCCH, the terminal device receives a first message based on the first MCCH, determines whether the message includes information about the first service, and if the message includes the information about the first service, reads the information about the first service.

In a possible design, before the access network device sends the first configuration information, that is, before step

900, the core network device sends service configuration information to the access network device. The service configuration information indicates a QoS requirement of M services, M≥N, and M is a positive integer. The access network device configures N MCCHs for the M services based on the QoS requirement of the M services, and sends fourth configuration information to the core network device. The fourth configuration information is used to indicate a correspondence between the M services and the N MCCHs.

In one example, if the service configuration information indicates the QoS requirement of the M services but does not include a correspondence between the M services and N classification identifiers, the access network device divides the M services into N service groups based on the QoS requirement of the M services, allocates a classification identifier to each service group, and determines the N classification identifiers and the correspondence between the N classification identifiers and the M services. The access network device configures the N MCCHs based on the QoS requirement of the M services and the correspondence between the N classification identifiers and the M services, and the N MCCHs and the N classification identifiers are in a one-to-one correspondence. The access network device sends fourth configuration information to the core network device. The fourth configuration information includes the correspondence between the M services and the N classification identifiers and a correspondence between the N MCCHs and the N classification identifiers.

In another example, if the service configuration information indicates the QoS requirement of the M services and includes the correspondence between the M services and the N classification identifiers, the access network device configures the N MCCHs based on the QoS requirement of the M services and the correspondence between the M services and the N classification identifiers. The N MCCHs and the N classification identifiers are in a one-to-one correspondence. The access network device sends the fourth configuration information to the core network device. The fourth configuration information includes the correspondence between the N MCCHs and the N classification identifiers.

Optionally, the core network device, the access network device, or the application server further sends the correspondence between the M services and the N classification identifiers to the terminal device. Alternatively, if the terminal device expects to receive the first service, where the first service is one of the M services, the terminal device may send a service request for the first service to the core network device, and the core network device sends, to the terminal device, a classification identifier corresponding to the first service. Alternatively, the terminal device may send a service request for the first service to the access network device, and the access network device sends, to the terminal device, a classification identifier corresponding to the first service. Alternatively, the terminal device may send a service request for the first service to the application server, and the application server sends, to the terminal device, a classification identifier corresponding to the first service. The correspondence between the M services and the N classification identifiers or the classification identifier corresponding to the first service may be included in the first configuration information or may be a single piece of configuration information (for example, second configuration information) and is sent separately with the first configuration information.

For example, if the core network device sends the service configuration information to the access network device, where the service configuration information indicates three services, namely, the service 1, the service 2, and the service 3, the service 1 and the service 3 have a same reliability requirement, the reliability requirement of the service 1 is higher than a reliability requirement of the service 2, the service 1 and the service 3 correspond to a classification identifier 1, and the service 2 corresponds to a classification identifier 2, the access network device configures, based on the service configuration information, an MCCH 1 for the classification identifier 1 and configures an MCCH 2 for the classification identifier 2. The access network device sends a correspondence between the classification identifiers and the MCCHs to the core network device.

Alternatively, the core network device sends the service configuration information to the access network device, where the service configuration information indicates three services, namely, the service 1, the service 2, and the service 3, the service 1 and the service 3 have a same reliability requirement, and the reliability requirement of the service 1 is higher than a reliability requirement of the service 2. In this case, based on the service configuration information, the access network device uses the service 1 and the service 3 as one service group to which a classification identifier 1 is allocated, and uses the service 2 as one service group to which a classification identifier 2 is allocated. Further, the access network device configures an MCCH 1 for the classification identifier 1 and configures an MCCH 2 for the classification identifier 2. The access network device sends the correspondence between the classification identifiers and the MCCHs and the correspondence between the services and the classification identifiers to the core network device.

In addition, the access network device may further configure a plurality of frequency domain resources for the MCCH 1, so that the access network device sends messages of same content by using the plurality of frequency domain resources within a repetition period of the MCCH 1, or the access network device can perform combined sending by using a plurality of cells. That the access network device sends messages of same content by using the plurality of frequency domain resources within a repetition period of the MCCH 1 means that the access network device sends the messages of the same content at different frequency domain locations in a same time. UE may perform combined reception on the messages at a plurality of frequency domain locations, to enhance a receiving effect. That the access network device performs combined sending by using a plurality of cells means that the plurality of cells all send information by using same MCCH channel configuration information. In this way, when the UE receives a message, MCCH channel signals of the plurality of cells are superimposed and enhanced, to improve MCCH receiving quality, thereby improving reliability of a service transmitted by using an MCCH channel. For the MCCH 2, the access network device may configure the MCCH 2 by using a conventional MCCH configuration method in the conventional technology.

Further, the access network device sends the first configuration information to the UE. The first configuration information includes two pieces of MCCH configuration information. One piece of configuration information corresponds to the MCCH 1, and configuration information of the MCCH 1 includes a classification identifier 1. The other piece of configuration information corresponds to the MCCH 2, and configuration information of the MCCH 2 includes a classification identifier 2. If the UE expects to receive the service 1, the UE sends a service request for the service 1 to the core network device. The UE may receive the second configuration information from the core network device, where the second configuration information may indicate that a classification identifier corresponding to the service 1 is the classification identifier 1. In this case, the UE determines, based on the second configuration information, that the classification identifier corresponding to the service 1 is the classification identifier 1. The UE may determine, based on the classification identifier 1 and the first configuration information, that MCCH configuration information corresponding to the service 1 is the configuration information of the MCCH 1 and the MCCH 1. If the UE detects a modification notification of the MCCH 1, the UE receives a first message based on the MCCH 1. If the first message includes information about the service 1, the UE reads the information about the service 1.

In the foregoing embodiments provided in this application, various solutions of the communication method provided in the embodiments of this application are separately described from perspectives of the network elements and interaction between the network elements. It may be understood that, to implement the foregoing functions, the network elements, for example, the access network device, the terminal device, and the core network device, include corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

Figure 10:
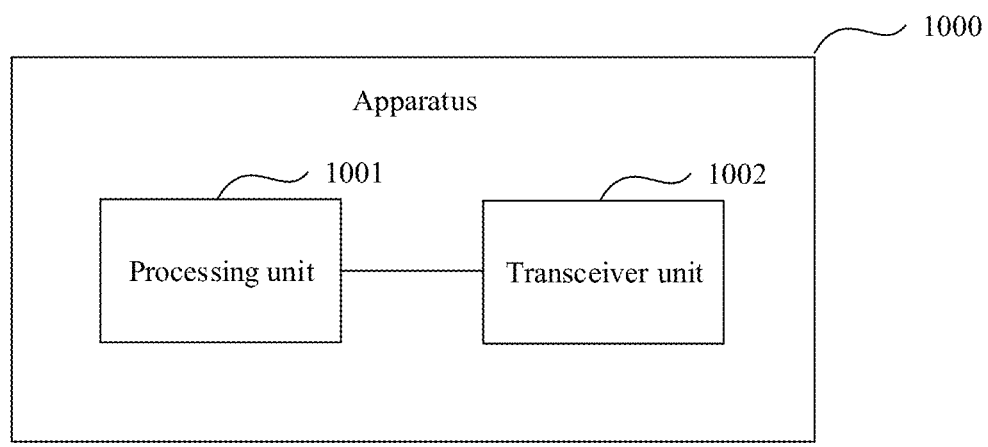
FIG. 10 is a schematic diagram 1 of a structure of an apparatus in this application.

The same as the foregoing concept, as shown in FIG. 10, an embodiment of this application further provides an apparatus 1000. The apparatus 1000 includes a transceiver unit 1002 and a processing unit 1001.

In an example, the apparatus 1000 is configured to implement functions of the terminal device in the foregoing methods. The apparatus may be a terminal device, or may be an apparatus in the terminal device.

The transceiver unit 1002 is configured to receive first configuration information, where the first configuration information indicates N modification periods, and N is an integer greater than 1.

The processing unit 1001 is configured to determine, based on the first configuration information, a modification period corresponding to a first service.

The processing unit 1001 is further configured to monitor a modification notification of an MCCH based on the modification period corresponding to the first service.

In an example, the apparatus 1000 is configured to implement functions of the access network device in the foregoing methods. The apparatus may be an access network device, or may be an apparatus in the access network device.

The processing unit 1001 invokes the transceiver unit 1002 to send first configuration information, where the first configuration information indicates N modification periods, and N is an integer greater than 1.

The processing unit 1001 further invokes the transceiver unit 1002 to send a modification notification of an MCCH based on a modification period corresponding to a first service, and the modification period corresponding to the first service is one of the N modification periods.

In an example, the apparatus 1000 is configured to implement functions of the core network device in the foregoing methods. The apparatus may be a core network device, or may be an apparatus in the core network device.

The processing unit 1001 invokes the transceiver unit 1002 to send service configuration information, where the service configuration information indicates a latency requirement of M services, and M is a positive integer.

The processing unit 1001 further invokes the transceiver unit 1002 to receive modification period configuration information from the access network device, where the modification period configuration information is used to indicate a correspondence between the M services and the N modification periods, M≥N, and N is an integer greater than 1.

For specific execution processes of the processing unit 1001 and the transceiver unit 1002, refer to the description in the foregoing method embodiments. Division into the modules in the embodiments of this application is an example, is merely division into logical functions, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

In another optional variation, the apparatus may be a chip system. In this embodiment of this application, the chip system may include a chip, or may include a chip and another discrete component. For example, the apparatus includes a processor and an interface, and the interface may be an input/output interface. The processor implements functions of the processing unit 1001, and the interface implements functions of the transceiver unit 1002. The apparatus may further include a memory. The memory is configured to store a program that can be run on the processor. When the processor executes the program, the method in the embodiments is performed.

Figure 11:
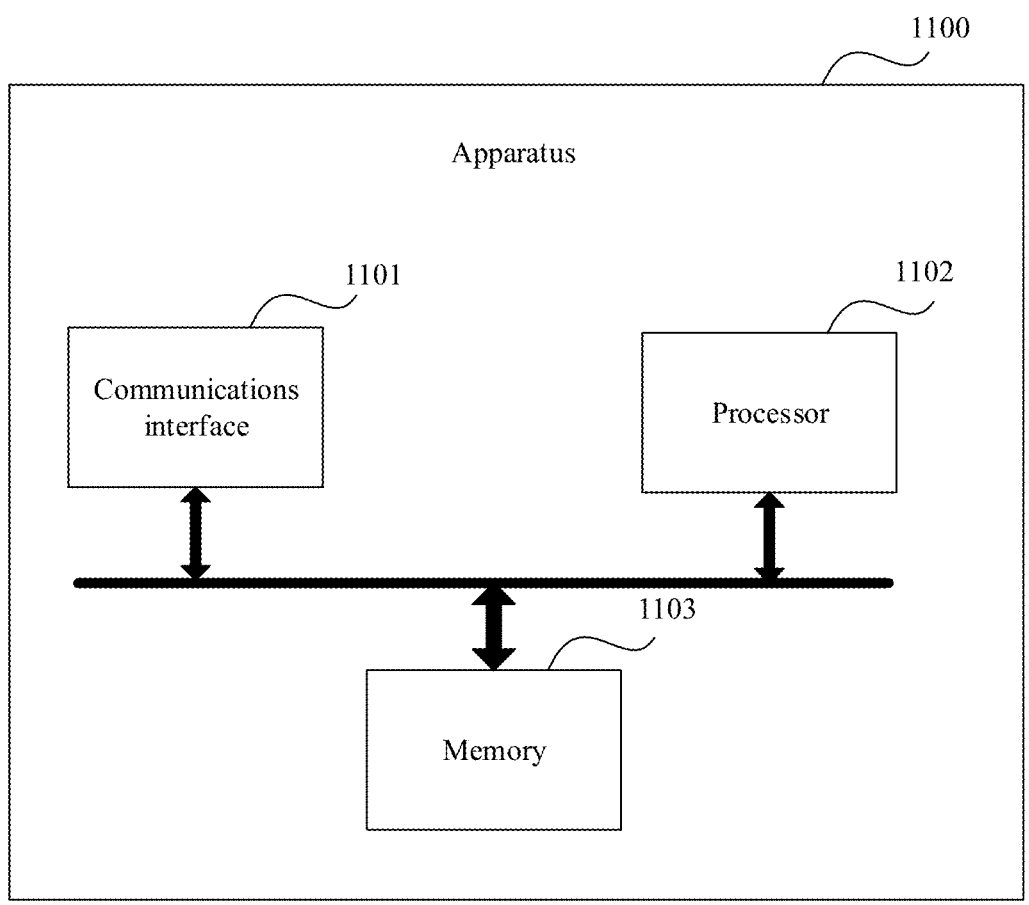
FIG. 11 is a schematic diagram 2 of a structure of an apparatus in this application.

The same as the foregoing concept, as shown in FIG. 11, an embodiment of this application further provides an apparatus 1100. The apparatus 1100 includes a communications interface 1101, at least one processor 1102, and at least one memory 1103. The communications interface 1101 is configured to communicate with another device by using a transmission medium, so that an apparatus in the apparatus 1100 can communicate with the another device. The memory 1103 is configured to store a computer program. The processor 1102 invokes the computer program stored in the memory 1103, and sends and receives data through the communications interface 1101, to implement the methods in the foregoing embodiments.

For example, when the apparatus is an access network device, the memory 1103 is configured to store a computer program. The processor 1102 invokes the computer program stored in the memory 1103, to perform, through the communications interface 1101, the methods performed by the access network device in the foregoing embodiments. When the apparatus is a terminal device, the memory 1103 is configured to store a computer program. The processor 1102 invokes the computer program stored in the memory 1103, to perform, through the communications interface 1101, the methods performed by the terminal device in the foregoing embodiments. When the apparatus is a core network device, the memory 1103 is configured to store a computer program. The processor 1102 invokes the computer program stored in the memory 1103, to perform, through the communications interface 1101, the methods performed by the core network device in the foregoing embodiments.

In this embodiment of this application, the communications interface 1101 may be a transceiver, a circuit, a bus, a module, or a communications interface of another type. The processor 1102 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module. The memory 1103 may be a nonvolatile memory, for example, a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function. The memory 1103 is coupled to the processor 1102. Couplings in this embodiment of this application may be indirect couplings or communication connections between apparatuses, units, or modules, may be in an electrical form, a mechanical form, or another form, and are used for information exchange between the apparatuses, the units, or the modules. In another implementation, the memory 1103 may alternatively be located outside the apparatus 1100. The processor 1102 may cooperate with the memory 1103. The processor 1102 may execute program instructions stored in the memory 1103. At least one of the at least one memory 1103 may alternatively be included in the processor 1102. In this embodiment of this application, a connection medium between the communications interface 1101, the processor 1102, and the memory 1103 is not limited. For example, in this embodiment of this application, the memory 1103, the processor 1102, and the communications interface 1101 may be connected through a bus in FIG. 11. The bus may be classified into an address bus, a data bus, a control bus, or the like.

It may be understood that the apparatus in the embodiment shown in FIG. 10 may be implemented by the apparatus 1100 shown in FIG. 11. Specifically, the processing unit 1001 may be implemented by the processor 1102, and the transceiver unit 1002 may be implemented by the communications interface 1101.

An embodiment of this application further provides a computer-readable storage medium. The computer-readable storage medium stores a computer program. When the computer program is run on a computer, the computer is enabled to perform the method according to the foregoing embodiments.

All or some of the methods in the embodiments of this application may be implemented by using software, hardware, firmware, or any combination thereof. When software is used for implementation, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, a solid-state drive (SSD)), or the like.

The foregoing embodiments are merely used to describe the technical solutions of this application in detail. The description of the foregoing embodiments is merely intended to help understand the method of the embodiments of the present disclosure, and shall not be construed as a limitation on the embodiments of the present disclosure. Variations or replacements readily figured out by a person skilled in the art shall fall within the protection scope of the embodiments of the present disclosure.

What is claimed is:

1. A method for sending a multicast control channel (MCCH), wherein the method comprises:
    receiving, by a terminal device, first configuration information, wherein the first configuration information indicates N modification periods, and N is an integer greater than 1, and wherein the first configuration information comprises a classification identifier corresponding to each modification period;
    determining, by the terminal device based on a classification identifier corresponding to a first service and the first configuration information, a modification period corresponding to the first service; and
    monitoring, by the terminal device, a modification notification of a MCCH based on the modification period corresponding to the first service.

2. The method according to claim 1, wherein the determining, by the terminal device based on the first configuration information, a modification period corresponding to a first service comprises:
    determining, by the terminal device based on a latency requirement of the first service and the first configuration information, the modification period corresponding to the first service.

3. The method according to claim 1, wherein:
    the first configuration information comprises N pieces of MCCH configuration information, wherein the N pieces of MCCH configuration information and N MCCHs are in a one-to-one correspondence, and wherein each piece of MCCH configuration information comprises a modification period of a corresponding MCCH and a classification identifier of the corresponding MCCH; or
    the first configuration information comprises the N modification periods of one MCCH and the classification identifier corresponding to each modification period.

4. The method according to claim 1, wherein:
the first configuration information comprises N pieces of MCCH configuration information and a first modification period, wherein the N pieces of MCCH configuration information and N MCCHs are in a one-to-one correspondence, wherein each piece of MCCH configuration information comprises a first coefficient of a corresponding MCCH and a classification identifier of the corresponding MCCH, and wherein a modification period of each MCCH is determined based on the first modification period and the first coefficient that is comprised in the MCCH configuration information and that is of the corresponding MCCH; or
the first configuration information comprises a first modification period, N first coefficients, and a classification identifier corresponding to each first coefficient, and the N modification periods are determined based on the first modification period and the N first coefficients.

5. The method according to claim 1, wherein:
the first configuration information further indicates N repetition periods, wherein the N repetition periods and the N modification periods are in a one-to-one correspondence; and
the first configuration information further comprises bias information, wherein the bias information is used to identify each repetition period.

6. The method according to claim 5, further comprising:
receiving, by the terminal device, third configuration information, wherein the third configuration information is used to notify version information of an MCCH transmitted in each repetition period; and
determining, by the terminal device based on the third configuration information, a repetition period used to perform combined reception on an MCCH.

7. A method for sending a multicast control channel (MCCH), wherein the method comprises:
sending, by an access network device, first configuration information, wherein the first configuration information indicates N modification periods, and N is an integer greater than 1, and wherein the first configuration information further comprises a classification identifier corresponding to each modification period; and
sending, by the access network device, a modification notification of an MCCH based on a modification period corresponding to a first service, wherein the modification period corresponding to the first service is one of the N modification periods, and wherein the modification period corresponding to the first service is determined based on a classification identifier corresponding to the first service and the first configuration information.

8. The method according to claim 7, wherein:
the first configuration information comprises N pieces of MCCH configuration information, wherein the N pieces of MCCH configuration information and N MCCHs are in a one-to-one correspondence, and wherein each piece of MCCH configuration information comprises a modification period of a corresponding MCCH and a classification identifier of the corresponding MCCH; or
the first configuration information comprises the N modification periods of one MCCH and the classification identifier corresponding to each modification period.

9. The method according to claim 7, wherein:
the first configuration information comprises N pieces of MCCH configuration information and a first modification period, wherein the N pieces of MCCH configuration information and N MCCHs are in a one-to-one correspondence, wherein each piece of MCCH configuration information comprises a first coefficient of a corresponding MCCH and a classification identifier of the corresponding MCCH, and wherein a modification period of each MCCH is determined based on the first modification period and the first coefficient that is comprised in the MCCH configuration information and that is of the corresponding MCCH; or
the first configuration information comprises a first modification period, N first coefficients, and a classification identifier corresponding to each first coefficient, and the N modification periods are determined based on the first modification period and the N first coefficients.

10. The method according to claim 7, further comprising:
receiving, by the access network device, service configuration information from a core network device, wherein the service configuration information indicates a latency requirement of M services, M≥N, M is a positive integer, and the first service is one of the M services;
configuring, by the access network device, the N modification periods for the M services based on the latency requirement of the M services; and
sending, by the access network device, modification period configuration information to the core network device, wherein the modification period configuration information is used to indicate a correspondence between the M services and the N modification periods.

11. The method according to claim 10, wherein:
the configuring, by the access network device, the N modification periods for the M services based on the latency requirement of the M services comprises:
dividing, by the access network device, the M services into N service groups based on the latency requirement of the M services, allocating a classification identifier to each service group, and determining N classification identifiers and a correspondence between the M services and the N classification identifiers; and
configuring, by the access network device, the N modification periods based on the latency requirement of the M services and the correspondence between the M services and the N classification identifiers, wherein the N classification identifiers and the N modification periods are in a one-to-one correspondence; and
the sending, by the access network device, modification period configuration information to the core network device comprises:
sending, by the access network device, the modification period configuration information to the core network device, wherein the modification period configuration information comprises the correspondence between the M services and the N classification identifiers, the N modification periods, and the classification identifier corresponding to each modification period.

12. The method according to claim 11, wherein:
the service configuration information further comprises a correspondence between the M services and the N classification identifiers;
the configuring, by the access network device, the N modification periods for the M services based on the latency requirement of the M services comprises:
configuring, by the access network device, the N modification periods based on the latency requirement of the M services and the correspondence between the M services and the N classification identifiers, wherein the N classification identifiers and the N modification periods are in a one-to-one correspondence; and the sending, by the access network device, modification period configuration information to the core network device comprises:

sending, by the access network device, the modification period configuration information to the core network device, wherein the modification period configuration information comprises the N modification periods and the classification identifier corresponding to each modification period.

13. The method according to claim 11, further comprising:

sending, by the access network device, second configuration information to a terminal device, wherein the second configuration information indicates the classification identifier corresponding to the first service.

14. An apparatus, comprising:

one or more processors; and one or more memories coupled to the one or more processors and storing programming instructions for execution by the one or more processors to cause the apparatus to:

receive first configuration information, wherein the first configuration information indicates N modification periods, and N is an integer greater than 1, and wherein the first configuration information comprises a classification identifier corresponding to each modification period;

determine, based on a classification identifier corresponding to a first service and the first configuration information, a modification period corresponding to the first service; and monitor a modification notification of a multicast control channel (MCCH) based on the modification period corresponding to the first service.

15. The apparatus according to claim 14, wherein the determining based on the first configuration information, a modification period corresponding to a first service comprises:

determining, based on a latency requirement of the first service and the first configuration information, the modification period corresponding to the first service.

16. The apparatus according to claim 14, wherein:

the first configuration information further comprises a classification identifier corresponding to each modification period.

17. The apparatus according to claim 16, wherein:

the first configuration information comprises N pieces of MCCH configuration information, wherein the N pieces of MCCH configuration information and N MCCHs are in a one-to-one correspondence, and wherein each piece of MCCH configuration information comprises a modification period of a corresponding MCCH and a classification identifier of the corresponding MCCH; or the first configuration information comprises the N modification periods of one MCCH and the classification identifier corresponding to each modification period.

18. The apparatus according to claim 16, wherein:

the first configuration information comprises N pieces of MCCH configuration information and a first modification period, wherein the N pieces of MCCH configuration information and N MCCHs are in a one-to-one correspondence, wherein each piece of MCCH configuration information comprises a first coefficient of a corresponding MCCH and a classification identifier of the corresponding MCCH, and wherein a modification period of each MCCH is determined based on the first modification period and the first coefficient that is comprised in the MCCH configuration information and that is of the corresponding MCCH; or the first configuration information comprises a first modification period, N first coefficients, and a classification identifier corresponding to each first coefficient, and the N modification periods are determined based on the first modification period and the N first coefficients.

19. The apparatus according to claim 14, wherein:

the first configuration information further indicates N repetition periods, wherein the N repetition periods and the N modification periods are in a one-to-one correspondence; and the first configuration information further comprises bias information, wherein the bias information is used to identify each repetition period.

* * * * *